US006834186B1

(12) United States Patent
Gallagher et al.

(10) Patent No.: US 6,834,186 B1
(45) Date of Patent: Dec. 21, 2004

(54) WIRELESS HANDSET FEATURE TRANSPARENCY BETWEEN SWITCHING NODES

(75) Inventors: Donald D. Gallagher, Boulder, CO (US); Russell B. Jorgensen, Arvada, CO (US); Robert J. Serkowski, Broomfield, CO (US); Jamie C. Su, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1193 days.

(21) Appl. No.: 08/777,722

(22) Filed: Dec. 20, 1996

(51) Int. Cl.[7] .............................. H04M 1/66; H04Q 7/20
(52) U.S. Cl. ........................ 455/411; 455/466; 455/436
(58) Field of Search ............................... 455/31.2, 422, 455/433, 458, 561, 406, 411, 466, 436; 370/328; 379/201, 207; 380/23

(56) References Cited

U.S. PATENT DOCUMENTS

| 5,177,780 | A | * | 1/1993 | Kasper et al. ............... 379/201 |
| 5,291,544 | A | * | 3/1994 | Hecker |
| 5,384,826 | A | * | 1/1995 | Amitay |
| 5,436,956 | A | * | 7/1995 | Shiotsuki et al. |
| 5,459,727 | A | * | 10/1995 | Vannucci |
| 5,544,226 | A | * | 8/1996 | Weis et al. |
| 5,550,896 | A | * | 8/1996 | Chavez, Jr. .................. 455/411 |
| 5,566,236 | A | * | 10/1996 | Melampy et al. ............ 379/201 |
| 5,583,917 | A | | 12/1996 | Jonsson ........................ 379/60 |
| 5,594,782 | A | * | 1/1997 | Zicker et al. |
| 5,615,267 | A | * | 3/1997 | Lin et al. ........................ 380/23 |
| 5,619,552 | A | * | 4/1997 | Karppanen et al. .......... 455/433 |
| 5,621,783 | A | * | 4/1997 | Lantto et al. ................. 455/406 |
| 5,629,974 | A | * | 5/1997 | Rajala et al. ................. 455/466 |
| 5,649,000 | A | * | 7/1997 | Lee et al. ...................... 455/436 |
| 5,666,399 | A | * | 9/1997 | Bales et al. ................... 379/207 |
| 5,873,035 | A | * | 2/1999 | Ladden et al. ............... 455/436 |

FOREIGN PATENT DOCUMENTS

| EP | 0660572 | 6/1995 | ............ H04M/3/42 |
| EP | 0735789 | 10/1996 | ............ H04Q/7/24 |
| WO | 9421075 | 9/1994 | ............ H04M/3/42 |
| WO | 9528812 | 10/1995 | ............ H04Q/7/22 |

OTHER PUBLICATIONS

Telecommunications Research Associates, "LexiCAT", Version 2.41, 1995.*

* cited by examiner

Primary Examiner—William Cumming
(74) Attorney, Agent, or Firm—John C. Moran

(57) ABSTRACT

Dividing the function of wireless handset control from the function of telecommunication call control in a software architecture of a wireless telecommunication system. The wireless handset control function follows the wireless handset as it registers and is handed off from switch node to switch node; the telecommunication call control function remains on the switch node on which the wireless handset first became active and remains on that switch node until the wireless handset becomes inactive. Upon the wireless handset becoming inactive, the wireless telecommunication call control function is transferred to the switch node on which the wireless handset is currently registered.

22 Claims, 29 Drawing Sheets

FIG. 5

LEVEL 5 ROUTING TABLE 502 - NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 101 | 101 |
| 102 | 101 |
| 103 | 101 |
| 104 | 101 |
| 105 | 101 |

LEVEL 4 ROUTING TABLE 503 - NODE 101

| NODE# | LDC OF | # OF HOPS |
|---|---|---|
| 108 | 111 | 3 |
| 108 | 120 | 2 |
| 107 | 120 | 3 |
| 107 | 111 | 4 |
| 106 | 120 | 1 |
| 106 | 111 | 2 |
| 104 | 111 | 3 |
| 104 | 120 | 4 |
| 103 | 111 | 2 |
| 103 | 120 | 3 |
| 102 | 111 | 1 |
| 102 | 120 | 2 |

LEVEL 7 ROUTING TABLE 501 - NODE 101

| TEL# | APP |
|---|---|
| MSR1XX | NMM |

LEVEL 7 SESSION RECORD TABLE 504 - NODE 101

| SESSION | SESSION | SESSION |
|---|---|---|
|  |  |  |

FIG. 6

LEVEL 5 ROUTING TABLE 602 - NODE 103

| TEL# | NODE |
|---|---|
| 8XX | 108 |
| 7XX | 107 |
| 6XX | 106 |
| 4XX | 104 |
| 2XX | 102 |
| 1XX | 101 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 301 | 103 |
| 302 | 103 |
| 303 | 103 |
| 304 | 103 |
| 305 | 103 |
| HS 402 | 103 |
| 402 | 103 |

607, 604, 606

LEVEL 4 ROUTING TABLE 603 - NODE 103

| NODE# | LDC OF | # OF HOPS |
|---|---|---|
| 108 | 117 | 1 |
| 107 | 117 | 2 |
| 106 | 117 | 2 |
| 104 | 113 | 1 |
| 102 | 112 | 1 |
| 101 | 111 | 1 |

LEVEL 7 ROUTING TABLE 601 - NODE 103

| TEL# | APP |
|---|---|
| HS 402 | HSM |
| 402 | FS |
| MSR 3XX | NMM |

608, 613

LEVEL 7 SESSION RECORD TABLE 604 - NODE 103

| SESSION | SESSION | SESSION |
|---|---|---|
| 344 | 343 | 343 |
| 343 | 342 | 341 |

LEVEL 5 ROUTING TABLE 702 - NODE 104

| TEL# | NODE |
|---|---|
| 8XX | 108 |
| 7XX | 107 |
| 6XX | 106 |
| 3XX | 103 |
| 2XX | 102 |
| 1XX | 101 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 401 | 104 |
| 403 | 104 |
| 404 | 104 |
| 405 | 104 |
| 402 | 103 |

706 (MSR4XX row), 707 (402 row)

LEVEL 4 ROUTING TABLE 703 - NODE 104

| NODE# | LDC OF | # OF HOPS |
|---|---|---|
| 108 | 113 | 2 |
| 107 | 114 | 1 |
| 106 | 113 | 3 |
| 103 | 113 | 1 |
| 102 | 113 | 2 |
| 101 | 113 | 3 |

LEVEL 7 ROUTING TABLE 701 - NODE 104

| TEL# | APP |
|---|---|
| MSR4XX | NMM |

LEVEL 7 SESSION RECORD TABLE 704 - NODE 104

| SESSION | SESSION | SESSION |
|---|---|---|
|  |  |  |

FIG. 8

LEVEL 5 ROUTING TABLE 802 – NODE 106

| TEL# | NODE |
|---|---|
| 8XX | 108 |
| 7XX | 107 |
| 4XX | 104 |
| 3XX | 103 |
| 2XX | 102 |
| 1XX | 101 |
| MSR 8XX | 108 |
| MSR 7XX | 107 |
| MSR 6XX | 106 |
| MSR 4XX | 104 |
| MSR 3XX | 103 |
| MSR 2XX | 102 |
| MSR 1XX | 101 |
| 601 | 106 |
| 602 | 106 |
| 603 | 106 |
| 604 | 106 |
| 605 | 106 |
| HS601 | 106 |
| 402 | 103 |

807, 804, 806

LEVEL 4 ROUTING TABLE 803 – NODE 106

| NODE# | LDC OF | # OF HOPS |
|---|---|---|
| 108 | 118 | 1 |
| 107 | 118 | 2 |
| 104 | 118 | 3 |
| 103 | 117 | 1 |
| 102 | 117 | 2 |
| 101 | 120 | 1 |

LEVEL 7 ROUTING TABLE 801 – NODE 106

| TEL# | APP |
|---|---|
| HS601 | HSM |
| 601 | FS |
| MSR 6XX | NMM |

808, 812

LEVEL 7 SESSION RECORD TABLE 804 – NODE 106

| SESSION | SESSION | SESSION |
|---|---|---|
| 341 | 345 | |
| 345 | 346 | |

LEVEL 5 ROUTING TABLE 502 - NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 101 | 101 |
| 102 | 101 |
| 103 | 101 |
| 104 | 101 |
| 105 | 101 |
| 402 | 103 |
| HS 402 | 101 |

901 → 402 row
902 → HS 402 row

LEVEL 4 ROUTING TABLE 503 - NODE 101

| NODE# | LDC OF | # OF HOPS |
|---|---|---|
| 108 | 111 | 3 |
| 108 | 120 | 2 |
| 107 | 120 | 3 |
| 107 | 111 | 4 |
| 106 | 120 | 1 |
| 106 | 111 | 2 |
| 104 | 111 | 3 |
| 104 | 120 | 4 |
| 103 | 111 | 2 |
| 103 | 120 | 3 |
| 102 | 111 | 1 |
| 102 | 120 | 2 |

LEVEL 7 ROUTING TABLE 501 - NODE 101

| TEL# | APP |
|---|---|
| HS 402 | HSM |
| MSR1XX | NMM |

903

LEVEL 7 SESSION RECORD TABLE 504 - NODE 101

| SESSION | SESSION | SESSION |
|---|---|---|
|  |  |  |

FIG. 10

LEVEL 5 ROUTING TABLE 602 – NODE 103

| TEL# | NODE |
|---|---|
| 8XX | 108 |
| 7XX | 107 |
| 6XX | 106 |
| 4XX | 104 |
| 2XX | 102 |
| 1XX | 101 |
| MSR 8XX | 108 |
| MSR 7XX | 107 |
| MSR 6XX | 106 |
| MSR 4XX | 104 |
| MSR 3XX | 103 |
| MSR 2XX | 102 |
| MSR 1XX | 101 |
| 402 | 103 |
| HS402 | 101 |
| 301 | 103 |
| 302 | 103 |
| 303 | 103 |
| 304 | 103 |
| 305 | 103 |

LEVEL 4 ROUTING TABLE 603 – NODE 103

| NODE# | LDC OF | # OF HOPS |
|---|---|---|
| 108 | 117 | 1 |
| 107 | 117 | 2 |
| 106 | 117 | 2 |
| 104 | 113 | 1 |
| 102 | 112 | 1 |
| 101 | 111 | 1 |

LEVEL 7 ROUTING TABLE 601 – NODE 103

| TEL# | APP |
|---|---|
| 402 | FS |
| MSR 3XX | NMM |

LEVEL 7 SESSION RECORD TABLE 604 – NODE 103

| SESSION | SESSION |
|---|---|
| | |

FIG. 11

LEVEL 4 ROUTING TABLE 503 – NODE 101

| NODE# | LDC OF | # OF HOPS |
|---|---|---|
| 108 | 111 | 3 |
| 108 | 120 | 2 |
| 107 | 120 | 3 |
| 107 | 111 | 4 |
| 106 | 120 | 1 |
| 106 | 111 | 2 |
| 104 | 111 | 3 |
| 104 | 120 | 4 |
| 103 | 111 | 2 |
| 103 | 120 | 3 |
| 102 | 111 | 1 |
| 102 | 120 | 2 |

LEVEL 5 ROUTING TABLE 502 – NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 101 | 101 |
| 102 | 101 |
| 103 | 101 |
| 104 | 101 |
| 105 | 101 |
| HS 402 | 101 |
| 402 | 101 |

1104

LEVEL 7 SESSION RECORD TABLE 1104 – NODE 101

| SESSION | SESSION |
|---|---|
|  |  |

LEVEL 7 ROUTING TABLE 501 – NODE 101

| TEL# | APP |
|---|---|
| HS 402 | HSM |
| 402 | FS |
| MSR1XX | NMM |

1103

LEVEL 4 ROUTING TABLE 703 – NODE 104

| NODE# | LDC OF | # OF HOPS |
|---|---|---|
| 108 | 113 | 2 |
| 107 | 114 | 1 |
| 106 | 113 | 3 |
| 103 | 113 | 1 |
| 102 | 113 | 2 |
| 101 | 113 | 3 |

LEVEL 5 ROUTING TABLE 702 – NODE 104

| TEL# | NODE |
|---|---|
| 8XX | 108 |
| 7XX | 107 |
| 6XX | 106 |
| 3XX | 103 |
| 2XX | 102 |
| 1XX | 101 |
| MSR8XX | 108 |
| MSR7XX | 107 |
| MSR6XX | 106 |
| MSR4XX | 104 |
| MSR3XX | 103 |
| MSR2XX | 102 |
| MSR1XX | 101 |
| 401 | 104 |
| 403 | 104 |
| 404 | 104 |
| 405 | 104 |
| 402 | 104 |

1102

LEVEL 7 SESSION RECORD TABLE 704 – NODE 104

| SESSION | SESSION | SESSION |
|---|---|---|
|  |  |  |

LEVEL 7 ROUTING TABLE 701 – NODE 104

| TEL# | APP |
|---|---|
| MSR4XX | NMM |

*FIG. 19*
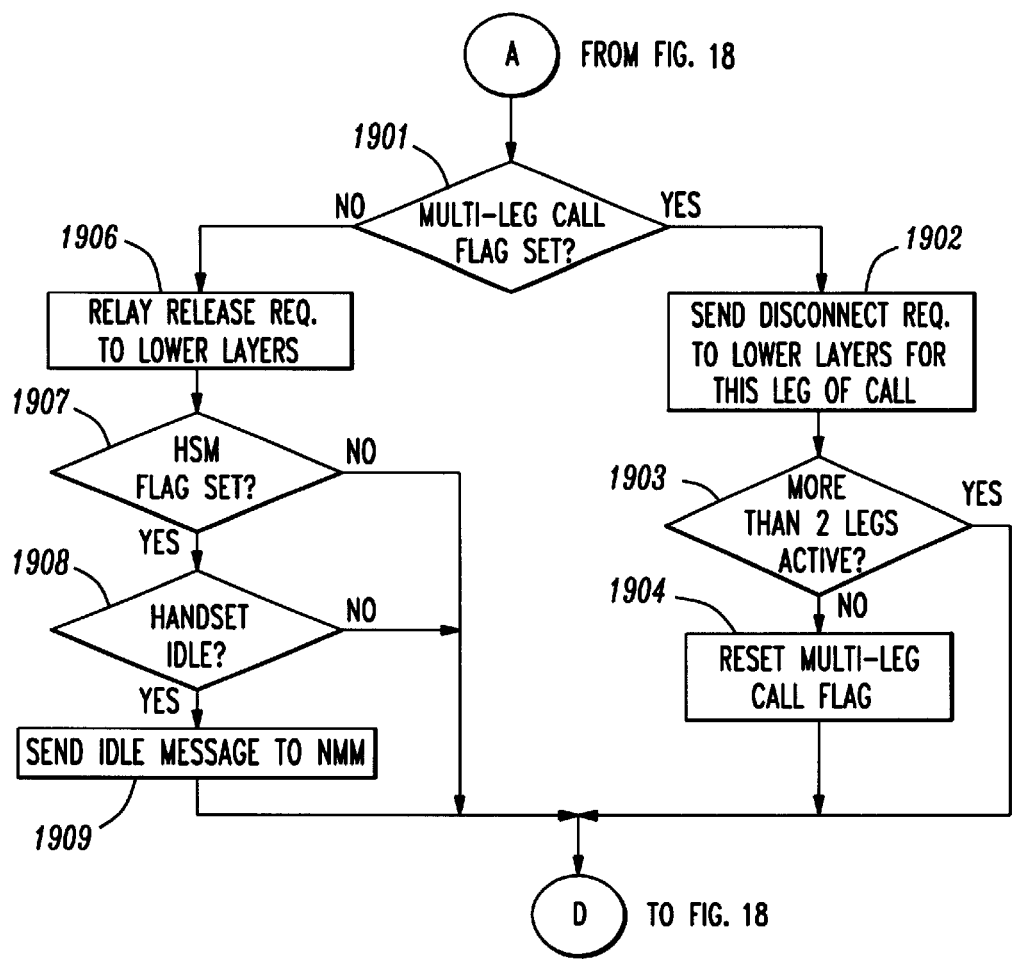
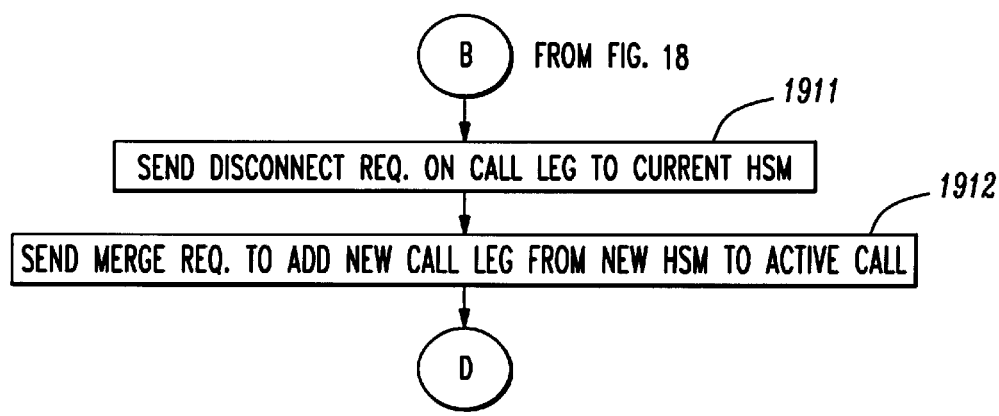

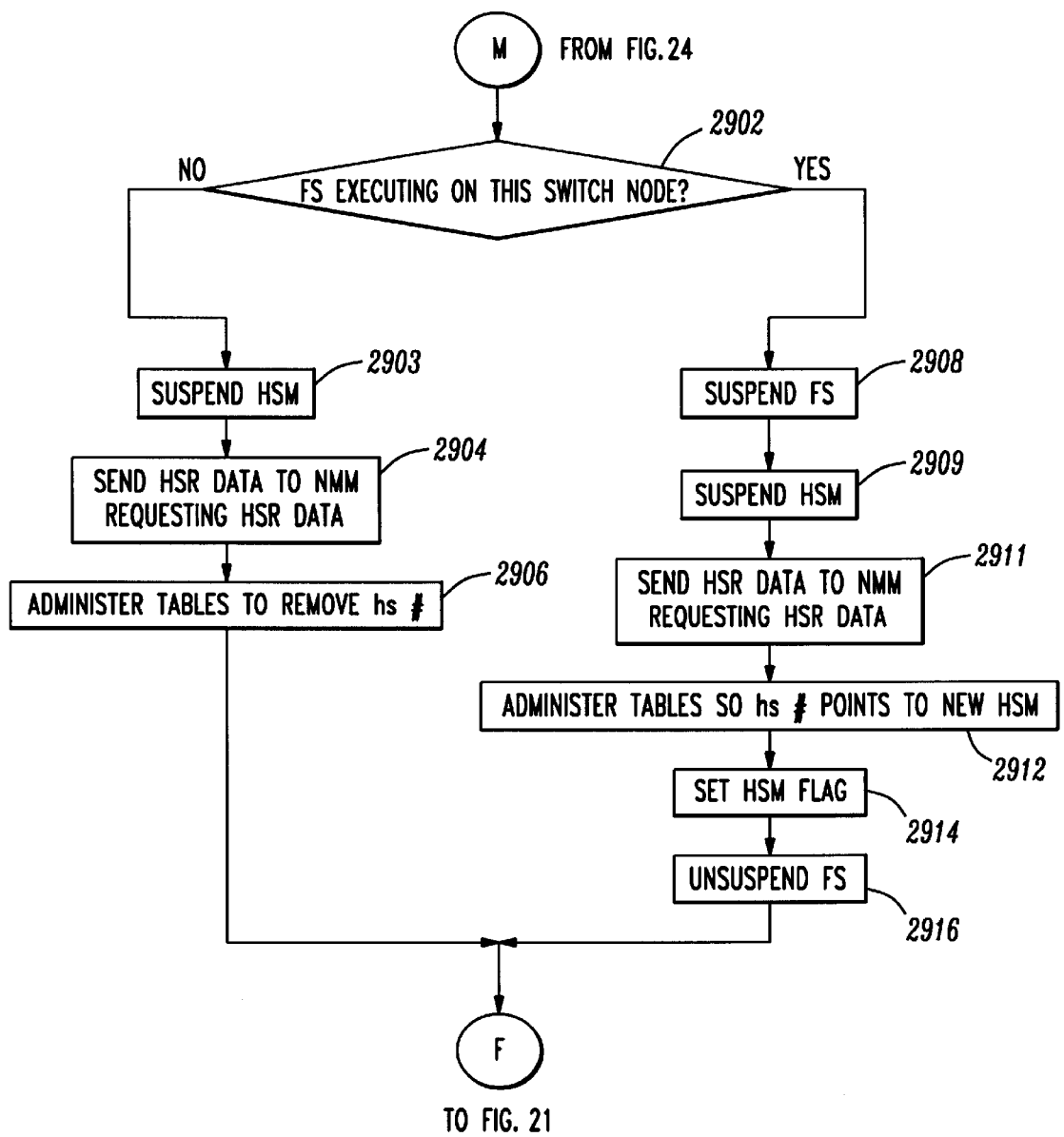

WIRELESS HANDSET FEATURE TRANSPARENCY BETWEEN SWITCHING NODES

TECHNICAL FIELD

This invention relates to communication switching, and in particular, to the provision of features to a wireless handset as the handset is handed off from switching node to switching node.

BACKGROUND OF THE INVENTION

Highly distributed switching systems are described in U.S. Pat. Nos. 5,182,751 and 5,377,262. Such distributed systems have an advantage in a wireless telecommunication system in that they are readily expandable at low cost. This is important in a wireless telecommunication system that is being used in the office, industrial, or warehouse environment where initially the system starts out with a minimal number of users and then grows to a large number of users. Such a distributed system consists of a number of switch nodes each of which is an independent switching system. An example of such a distributed system is illustrated in FIG. 1. Each switch node handles a relatively small number of wireless handsets such as a hundred wireless handsets. The manner in which the switch nodes communicate signaling information within the network of switch nodes and route calls is well described in the above-referenced U.S. patents.

The software architecture of the above-referenced U.S. patents was designed with wired telephone sets in mind. Whereas the distributed switch node architecture has been successfully applied to large wireless telecommunication systems there have arisen certain problems. These problems have resulted from the fact that as an individual user proceeds through the area covered by the distributed telecommunication system, they move from switch node to switch node; hence, must be registered on each switch node. This problem has not arisen in cellular switching systems because cells within a cellular system are so large that it is difficult for a user, even traveling at high speeds in an automobile, to move between more than two or three cells in the course of a conversation. However, in a PCS system based on a distributed switch node architecture as illustrated in FIG. 1, it is quite possible for a user who is walking rapidly and receiving multiple calls at a time to be registered on all switch nodes within the PCS system before becoming inactive. The result is that information concerning the user and their calls and any call features that have been invoked must be continuously handed off to the different switch nodes. Because of the distributed nature of the switch nodes, they do not each have an individual communication link to every node within the switch node architecture. This results in large amounts of data being moved during an active call through multiple switch nodes and enhances the possibility of calls being lost or mishandled.

It is clear that problems exist in the existing software architecture for distributed switch nodes in certain PCS system environments.

SUMMARY OF THE INVENTION

The foregoing problems are solved, and a technical advance is achieved by an apparatus and method in a distributed wireless telecommunication system. The software architecture of the wireless telecommunication system divides the function of wireless handset control from the function of telecommunication call control. The wireless handset control function follows the wireless handset as it registers and is handed off from switch node to switch node; advantageously, the telecommunication call control function remains on the switch node on which the wireless handset first became active and remains on that switch node until the wireless handset becomes inactive. Upon the wireless handset becoming inactive, the wireless telecommunication call control function is transferred to the switch node on which the wireless handset is currently registered.

Other and further aspects of the present invention will become apparent during the course of the following description and by reference to the accompanying drawing.

BRIEF DESCRIPTION OF THE DRAWING

FIGS. 5–11 illustrate routing tables utilized by the wireless telecommunication switching system;

FIGS. 18–20 illustrate the operations of a FS application; and

FIGS. 21–29 illustrate the operations of a NMM application.

DETAILED DESCRIPTION

Figure 1:
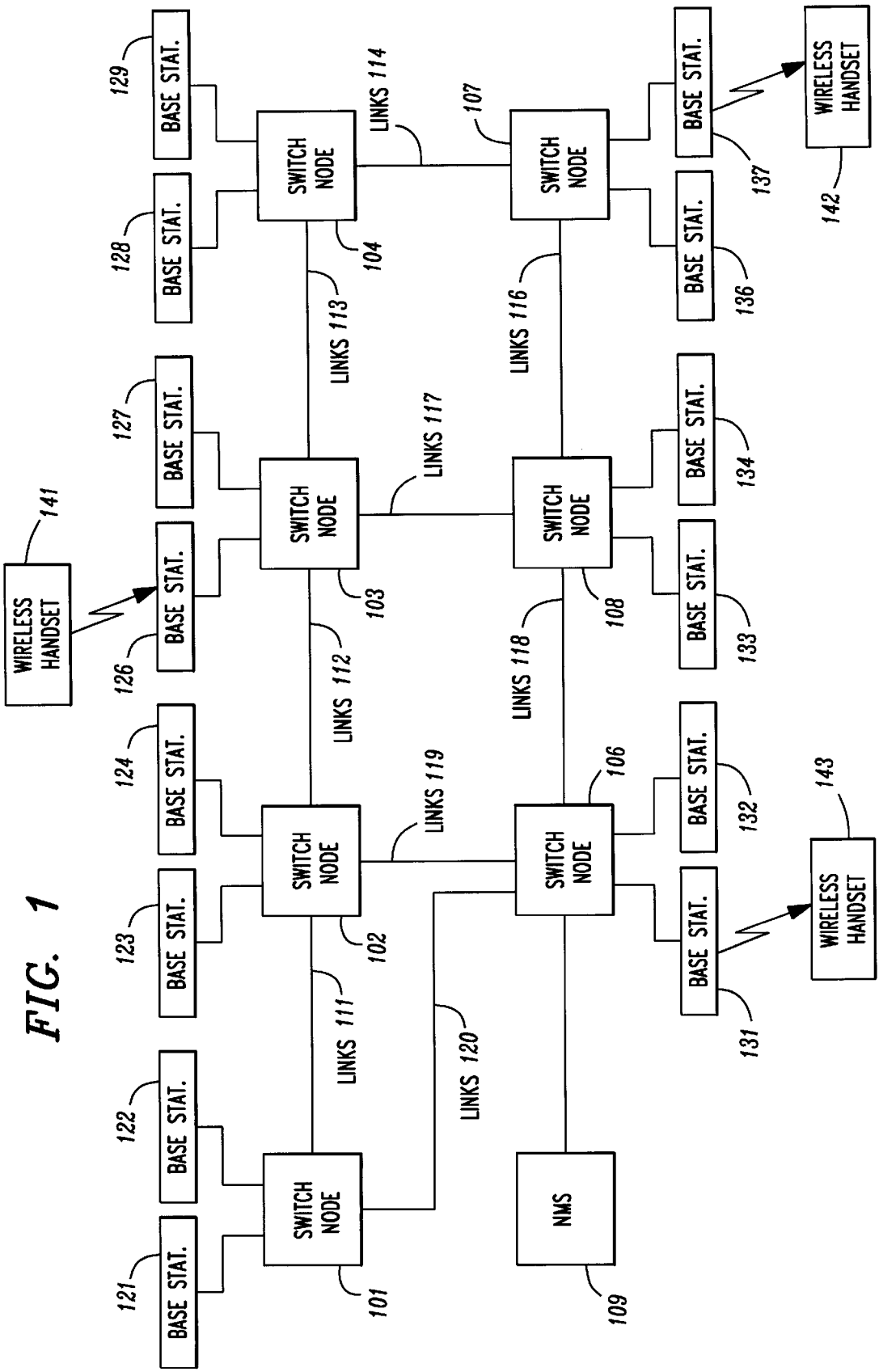
FIG. 1 illustrates a wireless telecommunication switching system embodying the inventive concept.

FIG. 1 illustrates a wireless telecommunication system having a plurality of distributed switch nodes. Each switch node is interconnected to a plurality of base stations with each base station providing service for wireless handsets such as wireless handsets 141, 142, and 143. In addition, wired telephones can be connected to the switch node by wired links. The switch nodes are interconnected by communication links such as primary rate interface (PRI) or basic rate interface (BRI) links. Each set of links such as links 111 may consist of a plurality of PRI or BRI links.

Figure 4:
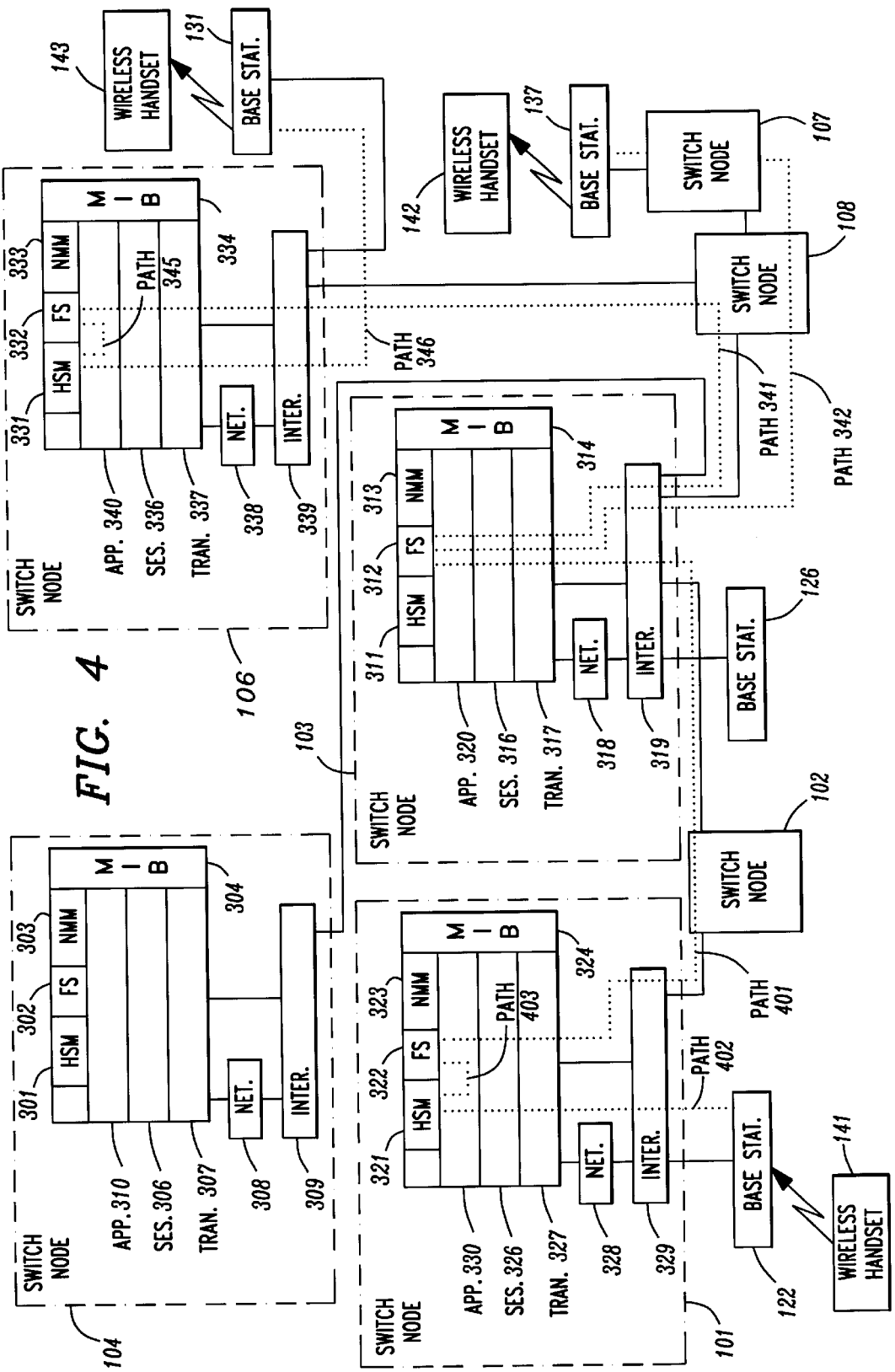

Unlike the distributed switch node systems of the previously referenced U.S. patents, the wireless telecommunication system illustrated in FIG. 4 does not have a dialing plan hierarchy of switch nodes nor a switch node hierarchy. When each switch node initializes, it obtains the telephone numbers of the wireless handsets assigned to the initializing switch node by placing a call to network manager service (NMS) 109. In addition, to getting the actual telephone numbers of the wireless handsets assigned to a switch node, each switch node receives the identification of the blocks of telephone numbers assigned to each of the other switch nodes in the wireless telecommunication system illustrated in FIG. 1. The manner in which a switch node initializes the links interconnecting it to other switch nodes and learns how to route calls through the switch node architecture is similar to the previously referenced U.S. patents. Each switch node also receives from NMS 109 the handset service record (HSR) and the feature service record (FSR) associated with each assigned handset. The master service record (MSR) is the combination of the FSR and HSR. The handset service record defines the type of handset and its configuration. The feature service record defines what features can be utilized by the handset, the associated buttons on the handset to invoke particular features, and features that are active. FIG. 5 illustrates the telephone numbers and related node information that are obtained from NMS 109 in table 502. For simplicity, each node is assumed to control a hundred telephone numbers with the hundredth digit reflecting the last digit of the node number. For example, node 108 controls telephone numbers 8XX indicating all 800 telephone numbers. For simplicity, it is assumed that each node has only five actual telephone numbers assigned to it however. For example, node 101 has telephone numbers 101–105 assigned to it as illustrated in table 502. Table 503 of FIG. 5 indicates how node 101 routes calls to other switch nodes. As will be explained later, the LDC refers to the link leaving switch node 101.

As will be described in greater detail later, each switch node has a network mobility manager (NMM), feature server (FS) application, and a handset manager (HSM) application. The NMM application on a switch node is involved in moving the information between switch nodes and adjusting the dialing plan. The FS application is concerned with establishing and performing call control functions required to set up calls and to implement telecommunication features. The HSM application performs the handset control function.

Consider the example, where wireless handsets 141, 142, and 143 are engaged in a three way conference. The wireless handsets are registered and active on the base stations illustrated in FIG. 1. The example assumes that the wireless handsets had been registered on the illustrated base stations at the start of the conference call. The call legs of the conference call are merged in switch node 103. In this case, the HSM and FS applications are together in switch nodes 103, 106, and 107. For example, in switch node 106, the HSM application in switch node 106 is controlling wireless handset 143, and the FS application in switch node 106 is performing all the call control functions with respect to wireless handset 143. The FS application in switch node 103 is performing all call control functions with respect to the conference call. In accordance with the invention, if wireless handset 141 now is handed off to base station 122 that is attached to switch node 101, the HSM application in switch node 101 now controls the handset control functions for wireless handset 141; however, the FS application in switch node 103 continues to control the call control functions for wireless handset 141 as well as control the conference call. In addition, the audio switching function of the conference call continues to be performed by the switching network of switch node 103. If wireless handset 141 was to be handed off to yet another base station connected to another node, the HSM application of that node would perform the handset control function; however, the FS application of switch node 103 would continue to perform the call control function for wireless handset 141. The invention has the advantage in that the call control function remains stationery within one switch node as long as wireless handset 141 is continuously active. Note, it is possible for wireless handset 141 to be active on two calls with one of the calls being in the call hold state.

Figure 2:
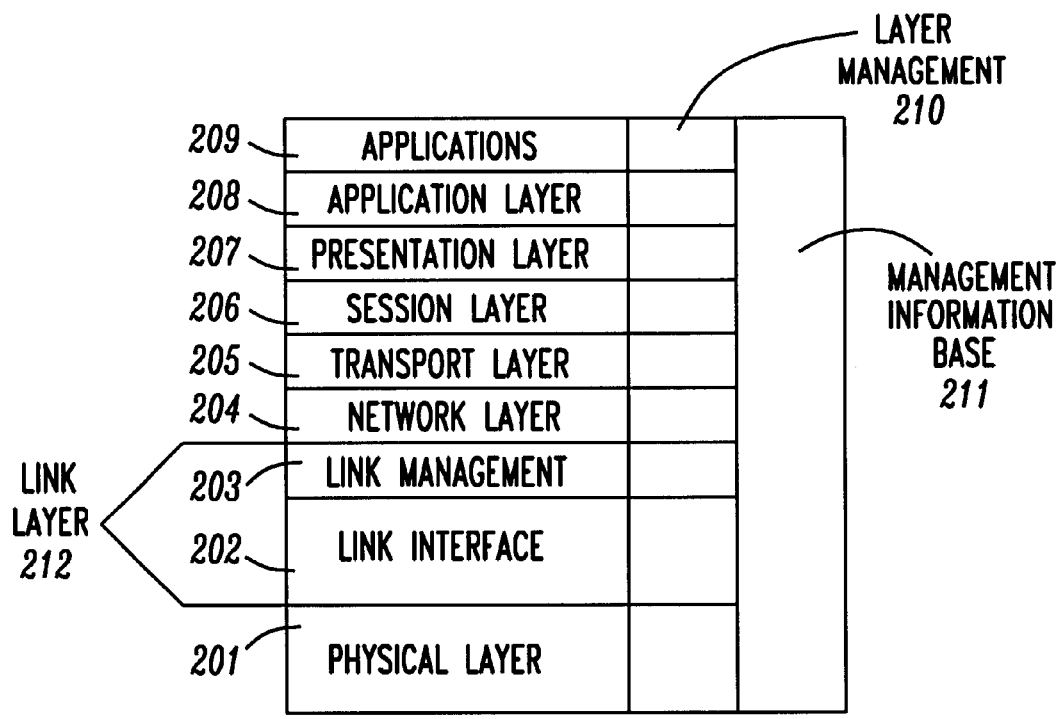
FIG. 2 illustrates the software layers of the software architecture implemented in each switch node.

FIG. 2 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN).

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via links 111, network layer 204 of switching node 101 negotiates with its peer layer (the corresponding network layer 204 in switching node 102) in order to obtain allocation of a B channel in links 111—a procedure later to be repeated if a second B channel is desired. This negotiation is carried out using standard ISDN Q.931 messages such as the call setup and connection messages via the LDC setup on the D channel of links 11. Network layer 204 identifies all B channels of given interface with the LDC for that interface. Network layer 204 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 204 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the detailed discussion of session layer 206, that layer, not transport layer 205, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by. session layer 206 to select the inter-node path. The transport layer performs its task of routing between various nodes by the utilization of tables defining the available paths and the options on those paths. These tables do not define all paths but only those paths which the node has already used.

Communication between transport layers is done by network layer 204 using established LDCs. Transport layer 205 communicates information destined for its peers to network layer 204, and network layer 204 packages this information within the information elements, IEs, of standard ISDN Q.931 messages. Network layer 204 uses the LDC that has been setup to a particular node to communicate this information to its peer network layer. Similarly, when another network layer receives information of this type, the other network layer unpackages information and then directs the information to the transport layer.

The primary function of session layer 206 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 206 any time two applications require communication with each other. As noted earlier, session layer 206 deals only in terms of switching nodes and applications on those switching nodes and relies on transport layer 205 to establish paths to other switching nodes. Session layer 206 identifies the called application by an address which previously in the telecommunication art was thought of as only a telephone number but has a much broader concept in the Q.931 protocol. From this address, session layer 206 determines the destination switching node. Session layer 206 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at software layer 209. When an application at software layer 209 is communicating with another peer application, the application is unaware of how many other applications exist or where these other applications are located. It is the function of application layer 208 to determine and use such details, consequently allowing the applications to be written in a very abstract manner.

Management information base 211 stores data used by the different software layers. Layer management 210 provides the link management entities required at each software layer.

Figure 3:
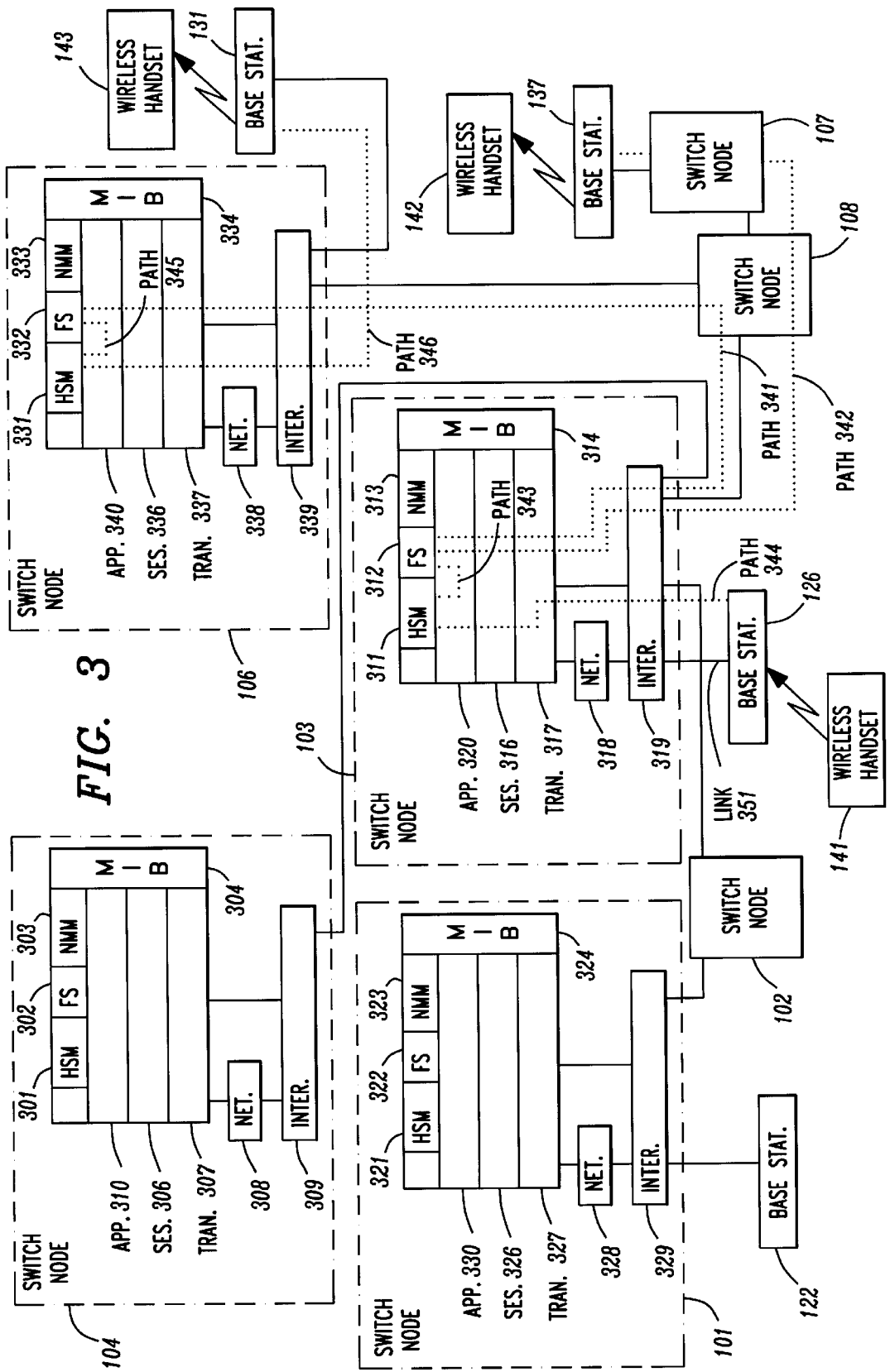
FIGS. 3 and 4 illustrate greater details of the wireless telecommunication switching system.

FIG. 3 illustrates the switch nodes associated with the previous example. Switch nodes 101, 103, 104, and 106 are illustrated in greater detail. The manner in which the elements 304–310, 314–320, 324–330, and 334–340 function with respect to each other is described in greater detail in U.S. Pat. No. 5,377,262 and U.S. Pat. No. 5,182,751 which are hereby incorporated by reference. Wireless handset 141 has assigned to it the number 402. As previously described, the telephone number 402 is assigned to switch node 104 as illustrated In FIG. 7. When wireless handset 141 first registered on base station 126, HSM 311 responds to this registration request. In order to register wireless handset 141, HSM 311 needs the HSR record. To obtain this record, HSM 311 directly requests the HSR from NMM 313. If an application is requesting or sending data or a message to another application in the same switch node, the data or message is simply sent between the applications at software layer 8. If an application is requesting or sending data or a message to an application in another switch node, a call is set up between the applications. Since wireless handset 141 is assigned the telephone number of 402, NMM 313 does not have the handset service record. To obtain the handset service record, NMM 313 places a call to NMM 303 of switch node 104. This call is placed utilizing the telephone number of msr402. In response to this telephone number, session layer 316 examines the level 5 routing table in switch node 103. It identifies from the level 5 routing table 602 of FIG. 6 the fact that the msr400 block of numbers are assigned to switch node 104 and requests that transport layer 317 route the call to switch node 104. Transport layer 317 is responsive to this routing request to access routing table 603 as illustrated in FIG. 6 and obtains the information that calls are routed to switch node 104 via links 113. As is stated in the incorporated applications, the lower software layers then route this call to switch node 104. Switch node 104 is responsive to the telephone number msr402 to route this call to NMM 303. The call establishes a signaling path between NMM 313 and NMM 303. NMM 313 requests the HSR from NMM 303. NMM 313 is responsive to the HSR to place this record in MIB 314 and to inform HSM 311 of this fact. HSM 311 then validates wireless handset 141. After validation is complete, HSM 311 informs NMM 313 of this fact. NMM 313 then sends a completion message to NMM 303. NMM 303 then idles HSM 301 and FS 302 with respect to wireless handset 402 on switch node 104. At this point, NMM 303 transmits the feature service record, FSR, to NMM 313 which places the FSR in MIB 314. NMM 303 then updates table 702 of FIG. 7 to identify the fact that handset 402 is active on switch node 103.

NMM 313 is responsive to the registration being complete to insert line 604 into table 602 of FIG. 6 to define that HSM 311 is now handling the handset control functions. In addition, NMM 313 inserts into line 606 of table 602 the fact that wireless handset 141 is now registered on switch node 103. Note, path 343 of FIG. 3 is only set up linking FS 312 and HSM 311 when wireless handset 141 is active on a call. Line 608 is inserted into level 7 routing table 601 of FIG. 6 to define the fact that telephone number hs402 should be routed to HSM 311. Similarly, line 613 is inserted into table 601 to define the fact that telephone number 402 should be routed FS 312. Paths 341, 342, and 343 have not yet been set up.

Consider now where wireless handset 141 places a call to wireless handset 143. Assume that the telephone number for wireless handset 143 is 601. This means that wireless handset 143 is not only registered on switch node 106, but switch node 106 is the home switch node for wireless handset 143. HSM 311 receives the digits for telephone number 601 and places a call to telephone number 402. It places a call to telephone number 402 because HSM 311 has no mechanism for knowing that the FS application serving wireless handset 141 resides on switch node 103 at this time. When the call placed by HSM 311 is received by application layer 320, the latter layer examines level 7 routing table 601 as illustrated in FIG. 6 for switch node 103 and determines from line 613 that the FS application serving wireless handset 141 at this time is FS 312. In response to this information, application layer 320 establishes a call request to FS 312. This sets up path 343, and in level 7 session record table 604, column 609 is inserted indicating that signaling has been established between FS 312 and base station 126 via HSM 311. Contained in this call request is the message requesting the call set up from HSM 311. The message from HSM 311 contains as a subparty address the telephone number of the destination telephone which is telephone number 601. In response to the subparty address, FS 312 then requests that a call be set up to telephone number 601. Application layer 320 is responsive to the request that a call be set up to telephone number 601 to examine level 7 routing table 601. Application layer 320 finds no entry for telephone number 601 in level 7 routing table 601 and transfers the call request to session layer 316. Session layer 316 is responsive to this request to examine table 602 of FIG. 6 and determine from line 607 that the 600 block of telephone numbers is assigned to switch node 106. Session layer 316 then requests that transport layer 317 establish a call to telephone number 601 via node 106. Transport layer 317 is responsive to this request to examine routing table 603 and determine that node 106 is reached via links 117. Transport layer 317 then requests that the lower layers transmit this call as a setup message. The call is then transmitted via signaling path 341 via switch node 108 to switch node 106.

When the setup message from FS 312 of switch node 103 is received by session layer 336 of switch node 106, session layer 336 examines table 802 of FIG. 8 and determines from line 807 that wireless handset 143 is presently registered on switch node 106. The setup message is then directed to FS 332. FS 332 establishes a call using the number "hs601" so as to establish communication with the handset manager application serving wireless handset 143. This call request is communicated to application layer 340. Application layer 340 is responsive to the call request to examine level 7 routing table 801. From line 808, application layer 340 determines that telephone number hs601 is handled by HSM 331. Communication is then established between FS 332 and HSM 331 via path 345. HSM 331 sends setup message to wireless handset 143 setting path 346. Wireless handset 143 responds with an alerting message. After getting alerting message from handset 143, HSM 331 transmits an alerting message back to FS 332 which in turn communicates the alerting message back to FS 312 via path 341. When wireless handset 143 answers the call, HSM 331 communicates a connect message to FS 332 which in turn transmits the connect message to FS 312. The lower software layers of switch node 103 are responsive to the connect message to set up network 318 so that wireless handsets 141 and 143 are connected in a audio connection via network 318.

Consider now when wireless handset 141 establishes a conference call by adding in wireless handset 142 to the present telephone call with wireless handset 143. It is assumed that the telephone number for wireless handset 142 is 701. The user of wireless handset 141 pushes the appropriate button to initiate a conference. A message is sent from wireless handset 141 to HSM 311. HSM 311 is responsive to this message to request that FS 312 establish a conference. If wireless handset 141 is marked in the feature service record as having the capability of creating conferences, FS 312 requests via HSM 311 that wireless handset 141 enter he telephone number for the desired third party. When the telephone number, 701, or wireless handset 142 is received by FS 312, FS 312 establishes a call via switch node 108 with the FS application in switch node 107 via path 342. After the FS application in switch node 107 has established a connection with wireless handset 142 via the HSM application in switch node 107, FS 312 requests that the lower software layers in switch node 103 establish a conference via network 318 between wireless handsets 141, 142, and 143. FS 312 updates the FSR of wireless handset 141 to reflect that there is an active conference call.

Consider now in the example when wireless handset 141 is handed off to base station 122 that is attached to switch node 101. When wireless handset 141 first establishes contact with base station 122, it signals HSM 321 of switch node 101 that an active handoff is to be performed. HSM 321 sends a message to NMM 323 with an active handoff request. Since wireless handset 141 which has the telephone number of 402 is not assigned to switch node 101, NMM 323 places a call to telephone number msr402. Application layer 330 examines level 7 routing table 501 of FIG. 7 for an entry of msr402. Not finding an entry, application layer 330 transfers the call request to session layer 326. Session layer 326 is responsive to this call request to examine table 502 of FIG. 5 and determine that the msr400 blocks of numbers are assigned to switch node 104. Session layer 326 then requests that transport layer 327 route the call to switch node 104. Transport layer 327 examines table 503 and determines that links 111 are to be utilized to place calls to switch node 104. Transport layer 327 then requests that the lower software layers of switch node 101 place the call to switch node 104.

When switch node 104 receives the call, session layer 306 is responsive to the dialed telephone number of msr402 to examine line 704 of table 702 and determine that NMM 303 is to receive the call. NMM 303 is responsive to the call to determine from line 707 of table 702 that wireless handset 141 is currently controlled by FS 312 on switch node 103. NMM 303 places a call to NMM 313 of switch node 103 and requests that NMM 313 suspend HSM 311 with respect to wireless handset 141 and send the current handset service record for wireless handset 141 to NMM 303. When NMM 303 receives the handset service record, it transmits this record to NMM 323 of switch node 101. NMM 323 is responsive to the data to insert line 901 into table 502 of FIG. 9 to designate that the FS application on switch node 103 is controlling wireless handset 141. In addition, NMM 323 adds the handset service record data for wireless handset 141 to MIB 324 of switch node 101. NMM 323 then adds line 902 to table 502 and adds line 903 to table 501 of FIG. 9 to identify the fact that HSM 321 is now handling wireless handset 141.

HSM 321 now calls telephone number 402. This call is routed by session layer 326 to switch node 103 setting up path 401 of FIG. 4. Session layer 316 of switch node 103 is responsive to the call to route the call to application layer 320 which routes the call to FS 312. FS 312 is responsive to the handoff request in the call to un-merge path 343 to HSM 311 as illustrated in FIG. 3 and to merge the call just received from HSM 321 into the calls presently set up with wireless handsets 142 and 143. This merging operation not only establishes signaling paths 401, path 341, and path 342 as being part of a common conference call but also establishes the audio connection through network 318 between wireless handsets 141–142. At this point the handoff is complete with respect to the awareness of the user of wireless handset 141. NMM 323 of switch node 101 sends a handoff completion message to NMM 303 of switch node 104.

When NMM 303 of switch node 104 receives the handoff completion message back from NMM 323 of switch node 101, NMM 303 transmits a handoff completion message to NMM 313 of switch node 103. Next, NMM 303 disconnects the call to NMM 323 that had been established to transfer the handset service record information to switch node 101. NMM 313 of switch node 103 is responsive to the completion message from NMM 303 to remove entry 604 from table 602 so that table 602 now appears as in FIG. 10. NMM 313 adds line 1001 to table 602 of FIG. 10 to indicate that HSM 321 of switch node 101 is now performing the handset control function. NMM 313 then sets a flag for FS 312. This flag informs FS 312 that upon wireless handset 141 becoming idle that FS 312 is to notify NMM 313. This is done so that when wireless handset 141 becomes idle, the call control function can be transferred to FS 322 of switch node 101 assuming that wireless handset 141 is still registered on switch node 101 at that time.

Consider now the operations that are taken when the conference call becomes idle. Assume that both wireless handset 143 and 142 become idle at approximately the same time. In switch node 106, HSM 331 informs FS 332 that wireless handset 601 is now idle. FS 332 sends a disconnect message via path 341 to FS 312. In response to the disconnect message, FS 312 changes the call records to reflect a two-way call between wireless handset 141 and wireless handset 142. FS 312 removes the network connection in network 318 to switch node 106 for wireless handset 143 by transmitting an un-merge message to the lower software layers. Path 301 is also removed. Similarly, when wireless handset 142 goes on hook, the FS application in switch node 107 also transmits a disconnect message. In response to the second disconnect message, FS 312 in switch node 103 removes the connection within network 318 as well as removing path 342. Because of the flag previously set when wireless handset 141 was handed off to switch node 101, FS 312 signals NMM 313 that wireless handset 141 is now idle.

NMM 313 places a call to NMM 303 and informs NMM 303 that wireless handset 141 is now idle and transfers the FSR to NMM 303. NMM 313 also suspends the operation of FS 312 with respect to wireless handset 141. In response to the FSR, NMM 303 sends this record to NMM 323 by first establishing a call to NMM 323. NMM 323 informs FS 322 of the receipt of the data and stores the data in MIB 324. In addition, NMM 323 removes line 901 from FIG. 9 and inserts line 1103 into table 501 and line 1104 into table 502 of FIG. 11 to indicate that FS 322 is now performing the call control functions for wireless handset 141. NMM 323 then sends a completion message to NMM 303 of switch node 104. In response to the completion message, NMM 303 transmits a message to NMM 313 of switch node 103 designating that the movement of the call control functions to switch node 101 is complete. NMM 313 removes the feature service record data from MIB 314. In addition, NMM 313 removes lines 606 and 1001 from table 602 and line 613 from table 601 of FIG. 10. Finally, NMM 303 of switch node 104 disconnects the calls that it has set up to NMM 313 and NMM 323. FIG. 11 illustrates the routing tables for switch nodes 101 and 104 after these operations are complete.

Figure 12:
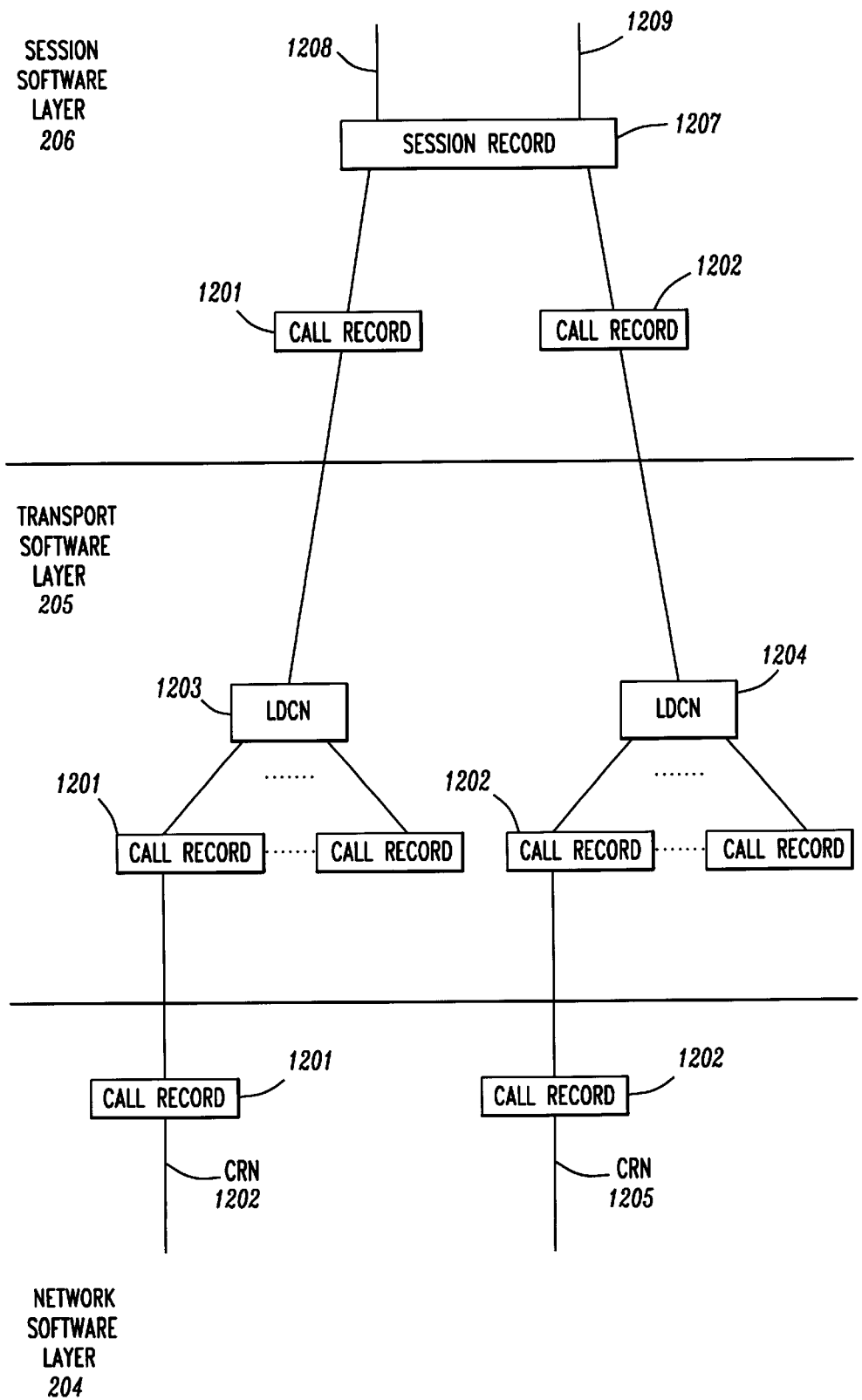
FIGS. 12 and 13 illustrate the logical structure of a call set up through the network, transport, session and application software layers.

This section describes call routing from the prospective of session software layer 206, transport software layer 205, and network software layer 204 of FIG. 2. FIG. 12 illustrates the manner in which calls are identified and processed between network software layer 204, transport software layer 205, and session software layer 206. Greater detail on call records logical D channel numbers (LDCN) and call reference numbers (CRN) is given in the previous incorporated U.S. Pat. No. 5,377,262. At network software layer 204, each half of a call is identified by the CRN number, e.g. CRN 1202. As can be seen from FIG. 12, the call record is common throughout the software layers, and each layer uses additional information along with the call record. The call records are taken from a common table within each switching node, and a call record number is unique within a particular switching node.

Transport software layer 205 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 12 for a particular call. Session software layer 206 is the point within the software architecture where calls are joined together for purposes of exchanging signal information by each call having a unique session set up for it such as session 1206. If a call is simply being routed through a switch node, the session record is associated with two call records such as call record 1201 and call record 1203 with each call record being part of half of a call. (Each half of a call is referred to as a "half call".)

Figure 13:
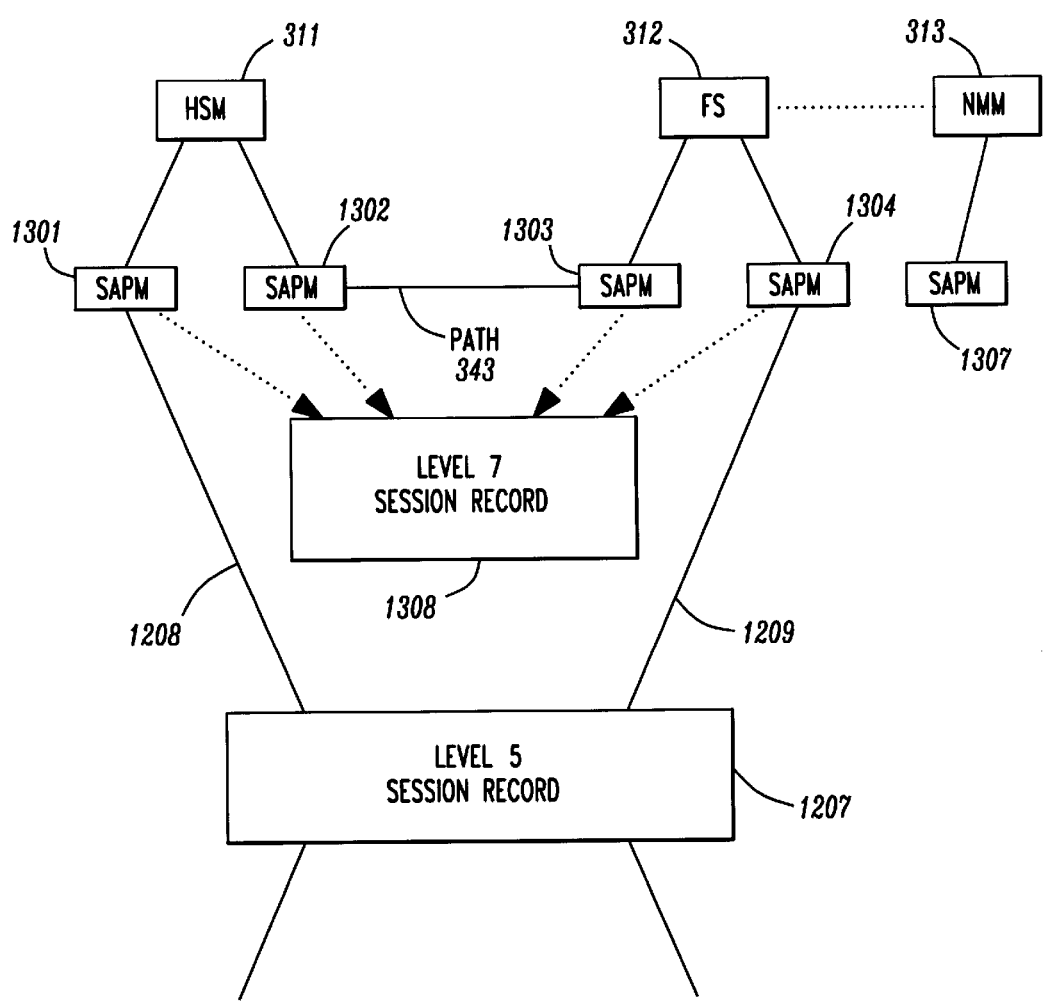

If a call is from or to an application, only one call record is utilized since the other half of the call terminates at the application software layer. Example of a simple application to application call would be where NMM 313 established a call to NMM 303 of FIG. 3. For this call, only one path, e.g., 1208 would leave session record 1207 and be directed to the application layer for connection to the NMM application. The third type of arrangement of the blocks illustrated in FIG. 12 must be considered in light of FIG. 13. An example of this type of the call is where wireless handset 141 had established a call to wireless handset 143 as illustrated in FIG. 3. Assume that CRN 1202 identifies the leg of the call coming from wireless handset 141 and CRN 1205 identifies the leg of the call coming from wireless handset 143 via path 341. The leg of the call illustrated as 1208 going to service access point map (SAPM) 1301 of FIG. 13 terminates on HSM 311. The leg of the call illustrated as 1209 terminates via SAPM 1304 on FS 312. Path 343 is illustrated as interconnecting SAPM 1302 and SAPM 1303. Elements 1301–1308 exist at application level 320 for switch node 103. Level 7 session record 1308 is utilized to establish the correspondence between the different portions of the call including legs 1208 and 1209. Level 7 session record 1308 is illustrated as table 604 in FIGS. 6 and 10. The level 7 session records for the other switch nodes are illustrated on the appropriate FIGS. 5–11. Messages are directly communicated between FS 312 and NMM 313. The connection manager whose operations are detailed in the previous incorporated U.S. patents is responsive to a request from the interface manager that executes at software layer 3 or a merge request generated by a FS application to examine level 7 session record and to properly set up level 5 session record 1207. The interface manager is responsive to the receipt on the downward call leg of an alerting, connection, or progress message to request such a set up by the connection manager. The connection manager will establish the audio and data connection via network 318 as well. From session software layer 206's point of view, it simply transfers and receives messages via legs 1208 and 1209. The operations performed by software layer 206 in response to these messages is set forth in the following paragraphs.

To understand how calls are processed by the three software layers illustrated in FIG. 12, consider the examples given in the following paragraphs. For these examples reference must be made to FIG. 3 which illustrates the interfaces associated with call records 1201 and 1203. For the case where a call is set up through switch node 108, call record 1201 is associated with links 117, and call record 1203 is associated with links 118 in the following example. Note, legs 1208 and 1209 do not exist.

Assume that a call is being received on links 117 which is destined for switch node 106 via links 118. LDCN 1208 was established when links 117 became active. When a setup message associated with the call is received via LDCN 1208, call record 1201 is established and associated with LDCN 1208 as the first half call is being initiated. The destination node number is transferred from network software layer 204 to transport software layer 205. Transport software layer 205 is responsive to the destination switch node number to determine that links 118 are the proper links to be used to set up the call through switch node 108 to switch node 106. The LDCN 1204 would have been the LDCN established when links 118 first became active. Note, that the LDCN number utilized in FIGS. 5–11 is simply the number of the links for simplicity. As set forth in the previously incorporated patent applications, the number would actually be a different number. The path that is set up with the up leg coming up through call record 1201 then through session record 1207 and down through call record 1202 and CRN 1205. All messages transferred on either links 117 or links 118 will be transferred up and down these call legs via session record 1207. Transport software layer 205 transmits the setup request to network software layer 204. The latter software layer transfers the setup request to switch node 106 via lower software layers and links 118. Assuming that switch node 106 responds with an alerting message, this message is transferred up through the second half call which is identified by call record 1203 via network software layer 204 and transport software layer 205 to session software layer 206. The latter software layer utilizes information in session record 1206 to identify the first half call which is associated with call record 1201. The alerting message is then communicated by transport software layer 205, network software layer 204, lower software layers, and links 117 to the originating switching node. The interface manager at software layer 3 is responsive to the alerting message to have the connection manager establish a connection through the network of switch node 108 for this call.

For a second example, assume that an application in switching node 102 transmits a setup message to establish a logical call with an application in switch node 103. The setup message is processed by setting up the first half call in the same manner as was done in the first example. However, after session software layer 206 has established session record 1206, it does not establish a second half call but rather transfers the information to the application in the applications software layer. The application responds with a connection request which is transferred down through software layers 206, 205, and 204 after which it is communicated to switching node 103 via links 112. Path 1208 is set up through level 7 and a SAPM to the application.

For a third example, assume the situation where wireless handset 141 placed a call to wireless handset 143. Assume now in FIG. 12 that LDCN 1208 was established when links 351 became active. Similarly, assume that LDCN 1204 was established when links 117 became established. When a set up message is received via LDCN 351, call record 1201 is established and associated with LDCN 1208 as the first half call is being initiated. The manner in which transport layer 205 or transport layer 317 of FIG. 13 transfer this call and in the manner in which session software layer 206 responds has been previously described. Session software layer 206 will route this call to application layer 320. The actions taken at application layer 320 have already been described with respect to FIG. 13.

Figure 14:
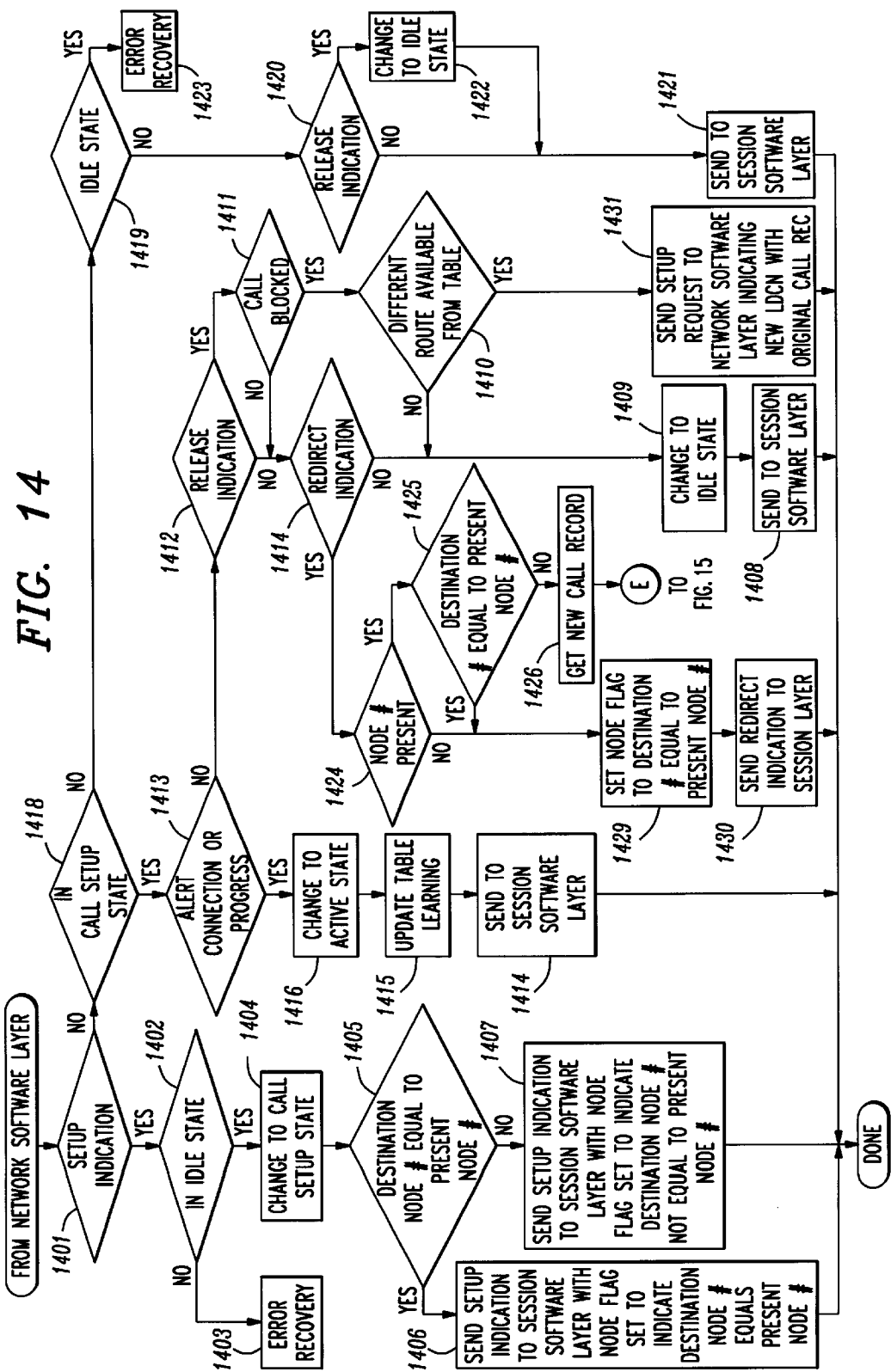
FIGS. 14 and 15 illustrate the operations of the transport software layer.

FIG. 14 illustrates the flow of information being received by transport software layer 205 for a half call from network software application 204. FIG. 14 illustrates the actions that are taken by the routines at transport software layer 205 in processing each unique combination of LDCN and call record such as LDCN 1208 and call record 1201 which define a half call (also referred to as a call leg). Each half call is assumed to be able to have three states at transport software layer 205: idle state, setup state, and active state. The idle state is the initial condition before the call record is associated with an LDCN. The setup state occurs after the setup indication is received from network software layer 204. The active state is entered from the setup state after the first end-to-end message is received from the other half of the call e.g. received from session software layer 206. An end-to-end message is an alerting, connection, or progress message. The software routine illustrated in FIG. 14 is responsive to indications received from network software layer 204 to either send a request back to network software layer 204 or to send indications to session software layer 206. The flow chart of FIG. 14 has two major sections. The first section comprises blocks 1402 through 1407 and is concerned with establishing a new half call in response to a setup indication from the network software layer. The second section comprises blocks 1408 through 1423 and is concerned with an established half call.

Decision block 1401 determines whether or not the indication being received from network software layer 204 is a setup indication. If it is a setup indication, decision block 1402 checks to see if the call is in the idle state. If the call is not in the idle state, error recovery block 1403 is executed since a setup indication should only be received when this half of the call is in the idle state. If the half call was in the idle state, block 1404 is executed to place this half call in the setup state. Decision block 1405 determines whether the node number of switch node 103 equals the destination node number of the setup indication. If the determination is yes, the node flag is set. The flag is available to both half calls. The node flag is utilized to pass this determination to session software layer 206. Blocks 1406 and 1407 are utilized to properly set the node flag to indicate whether or not switch node 103 is the designated node. The setup indication also includes the LDCN and call record number from network software layer 204 specifying which LDCN and call record are being utilized. (In this half of the call, the LDCN is LDCN 1208 and the call record is call record 1201). The call record was selected by network software layer 204 when the setup message was received from the physical layer. The LDCN is determined according to the link on which switch node 103 received the setup message.

With respect to block 1407, it will be recalled from the previous discussion with respect to FIG. 4 that the transport software layer performs all the necessary routing of a setup message which is not designated for the receiving switching node. However, it is necessary to transport such a setup message to session software layer 206 so that a session can be established for this call since the call is being routed through the receiving switching node. Block 1407 accomplishes this purpose. With respect to block 1406, it is necessary to pass the setup indication to session software layer 206 so that the latter software layer can perform the necessary actions utilizing the dialed number to determine the destination of the call (either an endpoint or a subsequent switching node).

Returning to decision block 1401, if the indication received from the network software layer was not a setup indication, decision block 1418 is executed to determine whether this half call is in the call setup state. If this half call is not in the call setup state, then decision block 1419 is utilized to assure that this half call is not in an idle state. The idle state indicates an error at this point, and error recovery block 1423 would be executed. Assuming that this half call is not in the idle state, the indication is checked to see whether it is a release indication. If it is, block 1422 is executed which returns the state of the half call back to the idle state and releases the call record. In both cases whether or not a release indication is executed, the indication is sent to session software layer 206.

Returning to decision block 1418, if the half call is in the call setup state, decision block 1413 checks to see if this is an alerting, connection, or progress indication which indicate that the call is to go from the call setup state to the active state. ISDN protocol allows for any three of these messages to be given in response to setup message under various conditions. If the answer to the determination in decision block 1413 is yes, block 1416 is executed to change the half call to the active state. Then, block 1415 is executed to utilize the information contained in the routing vector of the indication (which has been transferred from the network software layer) to update the level 4 routing tables. Finally, block 1414 transfers the indication to session software layer 206.

Returning to decision block 1413, if the answer is no to the determination made by the latter decision block, decision block 1412 is executed to determine whether or not the received message is a release indication. If it is not a release indication, the indication is transferred to the session software layer by blocks 1408 and 1409 since it does not affect this layer. If it is a release indication, this indication is handled in an improved manner in comparison to prior art telecommunication systems. First, the release indication is checked by decision block 1411 to see whether it indicates that the call was blocked. If the call was blocked, decision block 1410 is executed to see whether or not there exists another path to the destination. This logic as determined by decision blocks 1411 and 1410. If block 1410 is executed, an assumption is made that a set up message sent to a distant switching node has resulted in the distant node sending a release message. In response to the release message, switch node 103 is attempting to find another path to the destination switching node utilizing the level 4 routing tables as previously discussed. If a new path is found by decision block 1410, control is transferred to decision block 1431. The latter block sends a setup request to network software layer 204 requesting that the latter software layer attempt to establish the call utilizing a new LDCN number (which is supplied by transport software layer 205) defining the new path using the original session record and call record. Since the original session record is being utilized, it is not necessary for any additional work to be done by session software layer 206; hence, no indication is transferred to session software layer 206. If either decision block 1411 or 1410 makes a negative determination, block 1409 is executed as previously described.

Figure 15:
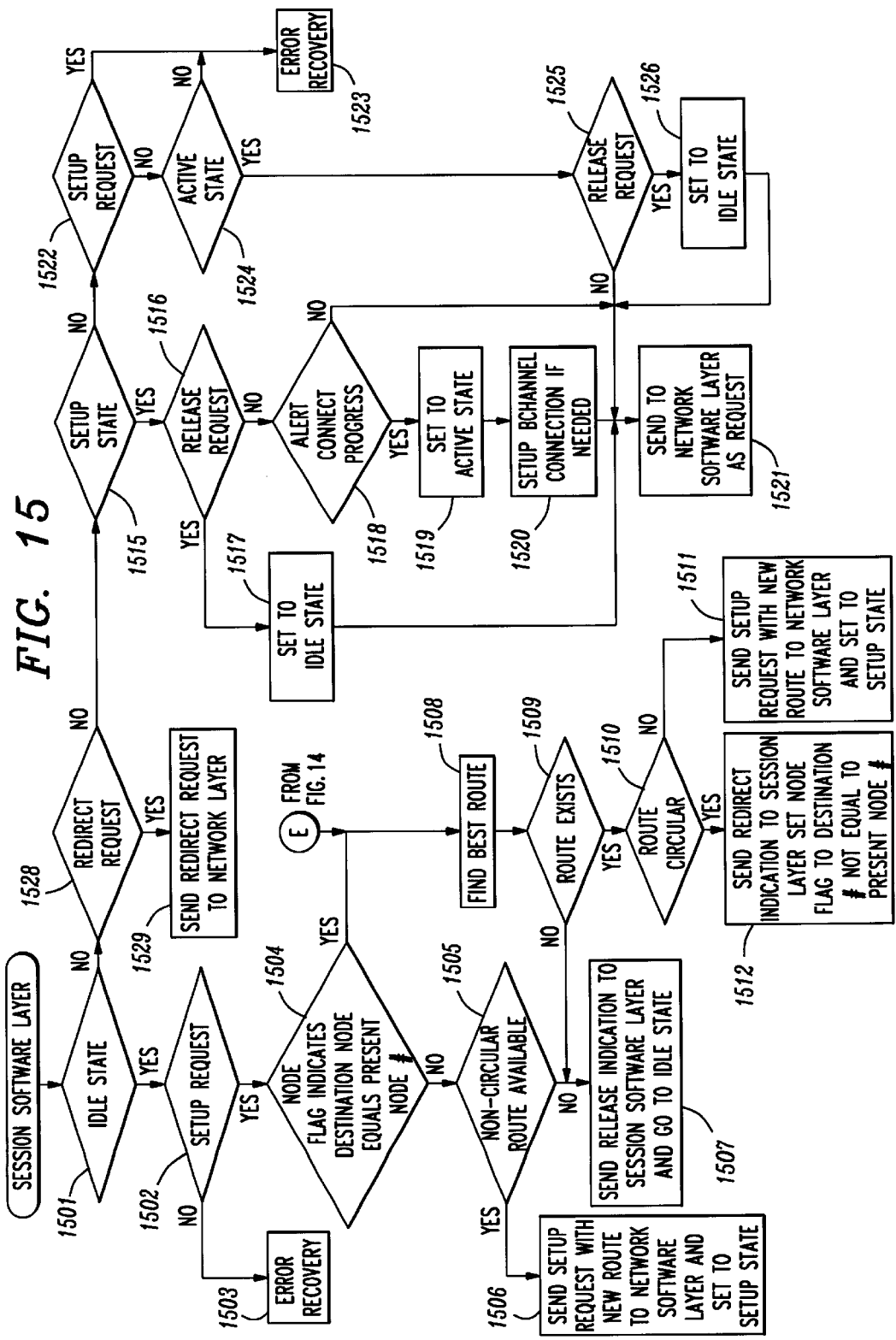

FIG. 15 illustrates the actions taken by transport software layer 205 in response to requests being received from session software layer 206. FIG. 15 has two main sections. The first section comprises blocks 1502 through 1512 and is concerned with the initial step of setting up a new half call. The second section comprises blocks 1515 through 1526 and is concerned with an established half call. An established half call is either in the setup or active state.

Decision block 1501 checks whether or not the state of the half call is in the idle state. If the half call is in the idle state, decision block 1502 checks to see whether a setup request is being received from session software layer 206. If it is not a setup request, then block 1503 is executed to perform error recovery. If it is a setup request, decision block 1504 is executed to check the node flag which could have been previously set by transport software layer 205 during processing of the other half call by either decision block 1406 or 1407 of FIG. 14. If the node flag is not set, this indicates that the session software layer is setting up a call originating on this switching node or that this switching node is a tandem point for a previously routed call. In this situation, the transport software layer must either route the call in a forward, non-circular direction or disconnect the call because no route is available. To do this, decision block 1505 determines from the route vector present in the message as received from a distant node and the level 4 routing tables whether or not a non-circular route is available. If there is a non-circular route available, block 1506 is executed to send a setup request along with a LDCN number to network software layer 204. The LDCN identifies the new route. In addition, block 1506 sets the state equal to the setup state. If a non-circular route is not available, block 1507 is executed to send a release request to network software layer 204, to set the state equal to the idle state, and to inform level 5 to remove the session record.

Returning to decision block 1504, if the node flag indicates that the call was destined for the receiving switching node or originated on this switching node, block 1508 is executed to find the best route to the new destination node. (The best route is determined by the route that has the fewest intervening switching nodes). As will be described with respect to FIG. 16, session software layer 206 is responsive to the node flag indicating that switch node 103 is the incoming destination node to change the node number to a new node number if the call must be routed to another switching node. In such a case, switch node 103 is an intermediate node in the route to the other switching node. Decision block 1509 checks to see whether or not a route is found. If a route is found, decision block 1510 determines whether the route found is a circular route. (A circular route is identified if either the new destination switching node is in the list of switching nodes previously passed through or if the route selection would return to a previous switching node.) If it is a circular route, the redirect request is transmitted to network software layer 204 indicating that the node number has been changed and that backing up is the route for the call. The result is that a redirect message is sent to the switching node which transmitted the original setup request to switch node 103 since it is not necessary to route the call through switch node 103. The function of the redirect request was previously described. If the route is not circular as determined by decision block 1510, then block 1511 is executed to send the setup request out on the new route as defined by the LDCN determined in block 1508 to network software layer 204 and to set the state for this half call to the setup state.

Returning now to decision block 1501. If the determination is no, decision block 1515 is executed to determine whether this half call is in the setup state. If the half call is in the setup state, decision block 1516 determines whether or not it is a release request. If it is a release request, then the state of this half call is set to idle. If it is not a release request, then decision block 1518 is executed to determine whether the request is an end-to-end message. If the answer is yes, then block 1519 sets the state of this half call to the active state, block 1520 makes the B channel connection if it was a connect message, and block 1521 sends the request to network software layer 204. If the determination in decision block 1518 was no, then block 1521 is immediately executed.

Returning to decision block 1515. If the determination was no, decision blocks 1522 and 1524 determine whether the request is a setup request and the half call is in the active state, respectively. If the determination made by decision block 1522 was yes or the determination made by decision block 1524 was no, then error recovery block 1523 is executed. Otherwise, decision block 1525 is executed to determine whether or not the request is a release request. If it is a release request, this half call is set to the idle state by 1526 and block 1521 is executed.

Figure 16:
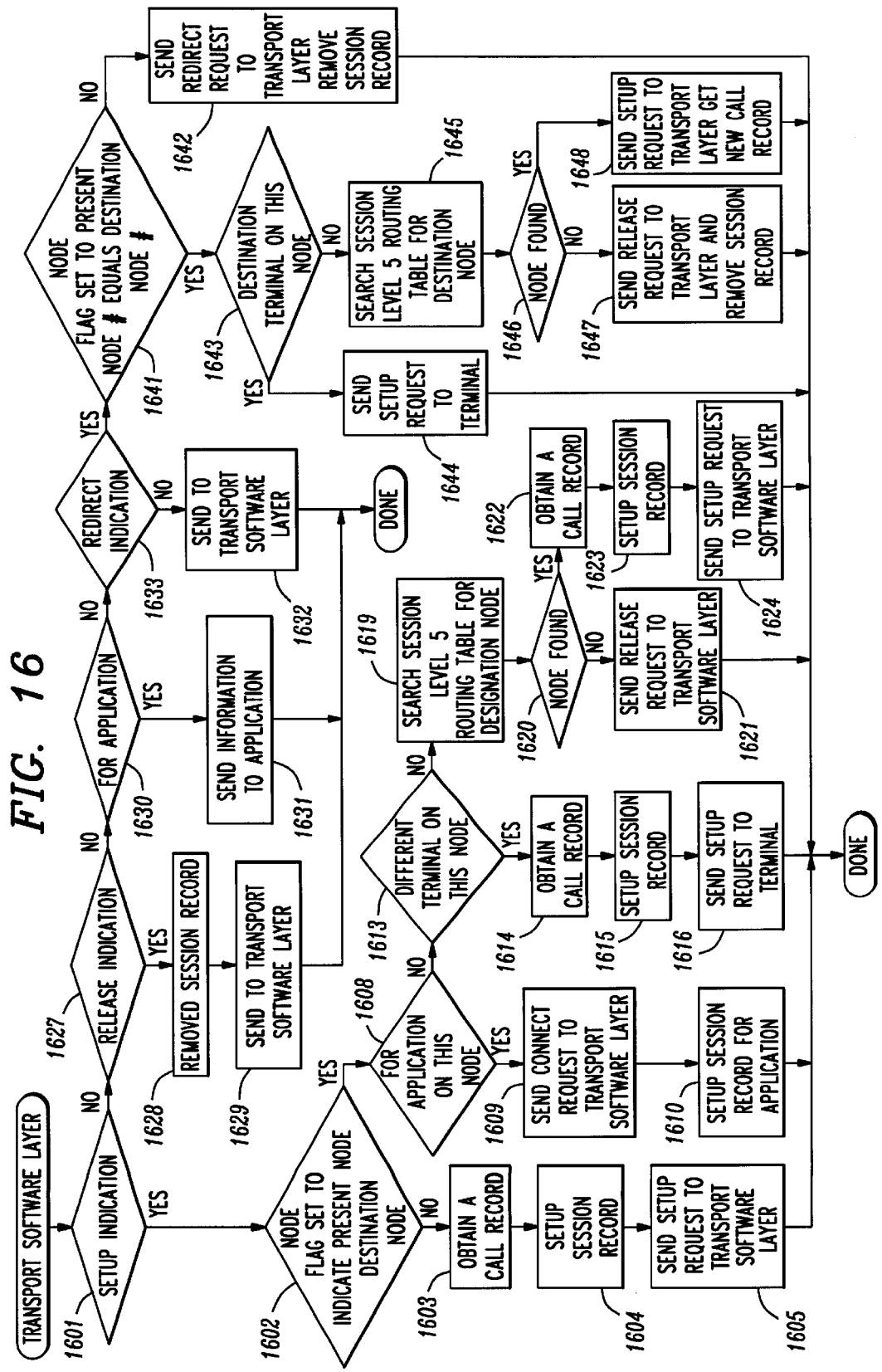
FIGS. 16 and 17 illustrate the operations of the session software layer.

FIG. 16 illustrates the response of session software layer 206 to indications being received from transport software layer 205. Recall from the discussion of FIG. 12 that the session software layer joins the two half calls to form a complete call utilizing a session record. In addition, calls which are terminated on an application in the application software layer are communicated by the session software layer to and from the designated application. In addition, the session software layer is responsive to a request coming down from an application to establish a call to an application. In addition, the session software layer performs routing on the dialed number as previously discussed utilizing the level 5 routing tables. FIG. 16 illustrates the operation of session software layer 206 in response to indications being received from transport software layer 205. Session software layer 206 is responsive to these requests to communicate the information to an application or to respond by transmitting additional requests to transport software layer 205. Requests transmitted to transport software layer 205 can be for either of the two half calls illustrated in FIG. 12. With respect to certain indications received from transport software layer 205, the session software layer 206 simply communicates these requests to the other half call.

Decision block 1601 is responsive to an indication received from the transport software layer to determine whether or not the indication is a setup indication. If the indication is a setup indication, decision block 1602 is executed to determine whether the node flag indicates that the receiving node (switch node 103) is the destination node of the indication. Recall that the node flag was set by blocks 1406 and 1407 of FIG. 14. If the determination in block 1602 is no, session software layer 206 does not need to perform any routing functions since the routing function will be performed on the node number which designates the destination node. However, a call record is obtained by block 1603 for the new half call which must be set up. For example, assuming that the setup indication had been received for the first half call dealing with call record 1201 of FIG. 12, the call record to be obtained for the second half call would correspond to call record 1203 assuming that the call is being transported on links 118. After the call record is obtained, block 1604 sets up a session record to associate the two half calls. Finally, block 1605 sends the setup request to transport software layer 205 so that the latter software layer can perform the routing of the setup message based on the node number for the second half of the call.

Returning to decision block 1602, if the answer to the determination is yes, decision block 1608 is executed to determine whether the half call is intended for an application on switch node 103. If the answer is yes, then block 1609 is executed to send a connect request back to the other switching node concerned with the half call. Note, that a second half call is not set up. However, it is necessary to set up a session record, and this function is performed by block 1610.

Returning to decision block 1608, if the answer to the determination is no, decision block 1613 is executed. If the answer is yes which means that the setup message is for a terminal connected to the switching node, blocks 1614 and 1615 are executed to establish a new half call, and a setup request is sent to the terminal by execution of block 1616.

Returning to decision block 1613, if the terminal or application is not present on this node it is necessary to try to establish a route to the terminal by first utilizing the dialed number to determine a switching node to which that terminal is connected. This action is performed by block 1619 as was previously described with respect to FIGS. 6 through 12. Decision block 1620 determines whether or not the search for a destination node was successful. If the search was not successful which indicates that switch node 103 cannot identify a switching node which hosts the terminal, block 1621 is executed and results in a release request being sent to transport software layer 205. If a destination node was found, blocks 1622 and 1623 are executed to establish a new half call. A setup request is sent to transport software layer 205 to establish the second half call with the switching node that was determined by execution of block 1619.

Returning to decision block 1601, if the indication is not a setup indication, decision block 1627 is executed to determine whether it is a release indication. If it is a release indication, block 1628 removes the session record which has the effect of removing the call. In addition, the release indication is sent to transport software layer 205 on the second half call. For example, if the release indication was received from the half call associated with call record 1201, block 1629 would transmit the release indication to the half call associated with call record 1203. As can be envisioned, this operation allows the call to be removed through a series of switching nodes.

Returning to decision block 1627, if the indication is not a release indication, decision block 1630 checks to see if the indication is associated with an application. This check is performed by simply examining the session record and communicating the information to the destination given in that record. Hence, if it is an application, block 2204 is executed. However, if it is not an application, the information is sent to the second half call by the execution of block 2205.

Figure 17:
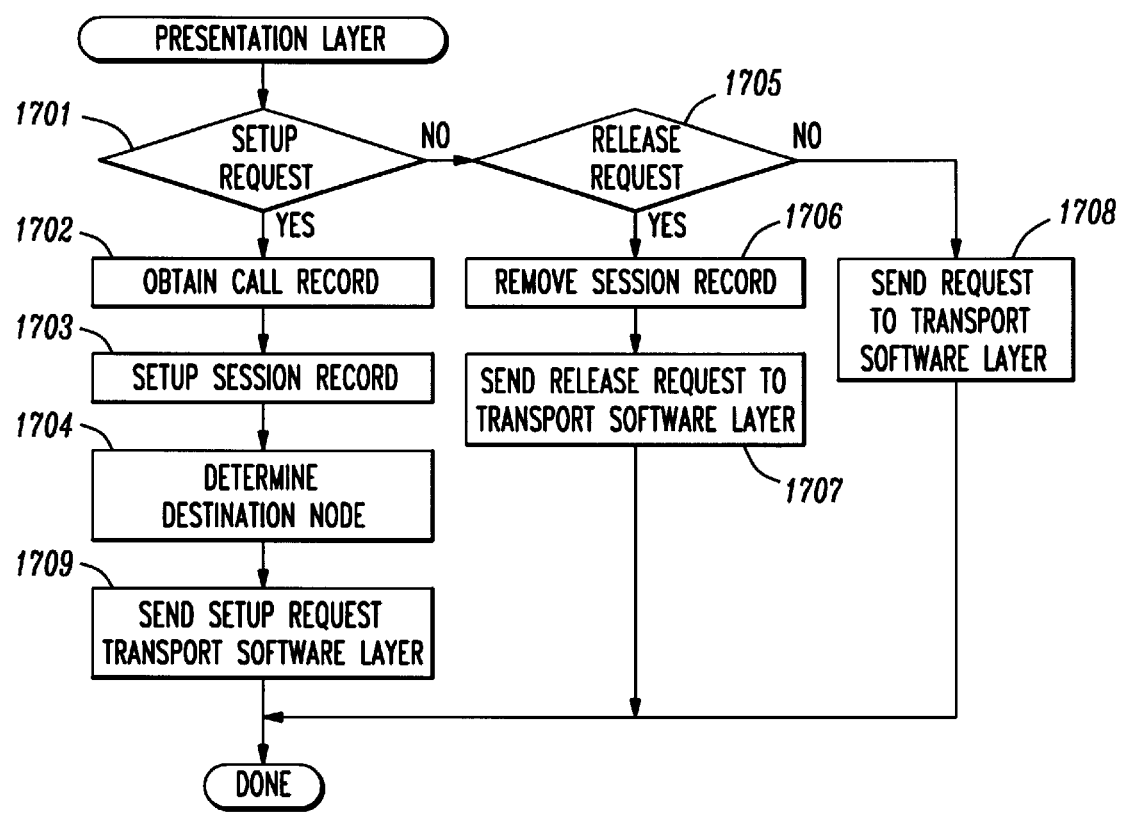

FIG. 17 illustrates the functions performed by the session software layer in response to requests being sent from the presentation layer. Decision block 1701 determines whether the request is a setup request. If it is a setup request, then a half call is established at the session software layer by execution of blocks 1702 and 1703. Block 1704 interprets the dialed number which was provided by the application to determine the destination node. Block 1709 then sends a setup request to the transport software layer.

Returning to decision block 1701, if the request is not a setup request, then decision block 1705 determines whether it is a release request. If it is a release request, then block 1706 removes the session record and transfers the release request to block 1707 for communication to the transport software layer. Returning to decision block 1705, if the answer is no, then block 1708 simply sends the request to the transport software layer for communication to the terminal or switching node which is engaged in a call with the application.

Before describing in greater detail the actions taken by software layers 204, 205, and 206 of FIG. 12 in implementing the redirect message, consider how the redirect message is coded. ISDN signaling is defined by the ISDN standard Q.931 and is intended to provide an international standard to control the initiation of calls, progress of calls, termination of calls, communication of national use information, local serving network information, and user-specific information for telecommunications systems and terminals. The redirect message information is coded as a vendor type message using conventional techniques. For a vendor or national type message, the first octel (which defines the message type) is an escape code which causes the switching node to examine the second octel to determine if the message is a national or vendor-type message.

Consider the operation performed by switching node 102 with respect to FIG. 12. As the setup message is received, it progresses up through software layers, 204, 205, and 206 along the left call leg of the call (call record 1201 and LDCN 1208). When the setup message is received by session software layer 206, it interrogates the level five routing tables and determines that the destination switching node is switch node 103. Session software layer 206 then transmits a setup request to transport software layer 205 along the right call leg of FIG. 12 (call record 1203 and LDCN 1204). However, when transport software layer 205 receives the setup request from session software layer 206, transport software layer 205 determines that a circular subpath would be set up between switching node 102 and 101. Consequently, transport software layer 205 transmits a redirect indication back to session software layer 205. Session software layer 206 is responsive to the redirect indication to remove session record 1206 and to send a redirect request to transport software layer 205 on the left call leg of FIG. 12. In turn, transport software layer 205 sends a redirect request to network software layer 204. The redirect request causes network software layer 204 to remove call record 1201, LDCN 1208, and CRN 1202 and to totally remove all lower protocols associated with this particular call. Also, network software layer 204 sends a redirect message to switch node 103.

Session software layer 206 of switching node 102 processes the setup indication as illustrated in FIG. 16 by executing decision blocks 1601 and 1602. Since the node flag was set to indicate that the present node number equals the destination node number, decision blocks 1608 and 1613 are executed with the determinations being "no" in both cases resulting in block 1619 being executed. Upon block 1619 being executed, the session software layer 206 of switching node 102 determines that the block of numbers containing the telephone number of BRI station set 123 had been given to switch node 103. Decision block 1620 determines that a designation node was found in block 1619 and causes blocks 1622, 1623, and 1624 to be executed which result in a call record and a setup session record being obtained and a setup request being transmitted in the right hand call leg of FIG. 12 to transport software layer 205 of switching node 102.

This setup request is processed by transport software layer 205 in accordance with FIG. 15. Decision blocks 1501, 1502, and 1504 are executed with "yes" determinations resulting. Since the answer to the determination posed by decision block 1504 is "yes", block 1508 is executed resulting in a path being determined to switch node 103 via links 117. Consequently, the answer to decision block 1509 is "yes", and the answer to decision block 1510 is "yes" since the route is circular resulting in block 1512 being executed. The execution of block 1512 results in a redirect indication being communicated to session software layer 206 along the right call leg of FIG. 12 and the node flag being set equal to the destination number not equaling the present node number. In this situation of a redirect indication being communicated to session software layer 206 along the right call leg, the node flag is utilized to indicate to the session software layer 206 that transport software layer 205 had determined a circular subpath.

At session software layer 206, the redirect indication is processed as illustrated in FIG. 16. Decision blocks 1601, 1627, and 1630 produce "no" determinations resulting in decision block 2206 being executed. Decision block 2206 determines whether the indication from the transport software layer was a redirect indication. Hence, the determination made by decision block 2206 is "yes". In response to this "yes" determination, decision block 1641 is executed resulting in the execution of block 1642 since the node flag is set to indicate that the destination node number does not equal the present node number. Execution of block 1642 results in a redirect request being communicated to transport software layer 205 for the left call leg of FIG. 12. Session software layer 206 removes session record 1206, and the redirect request specifies that the destination number is to be the node number of switch node 103. As will be described shortly, this results in a redirect message being sent back to switch node 103.

Transport software layer 205 is responsive to the redirect request to process this request as illustrated in FIG. 15. The determination made by decision block 1501 is "no" resulting in the execution of decision block 1523. Since it is a redirect request, decision block 1528 transfers control to block 1529 which transmits a redirect request to network software layer 204 along the left call leg of FIG. 12. Network software layer then transmits a redirect message to switch node 103. As the redirect request is processed by network software layer 204 and lower software layers, these software layers respond to the redirect request to clear the call with switch node 103 as if the redirect request was a release request.

Figure 18:
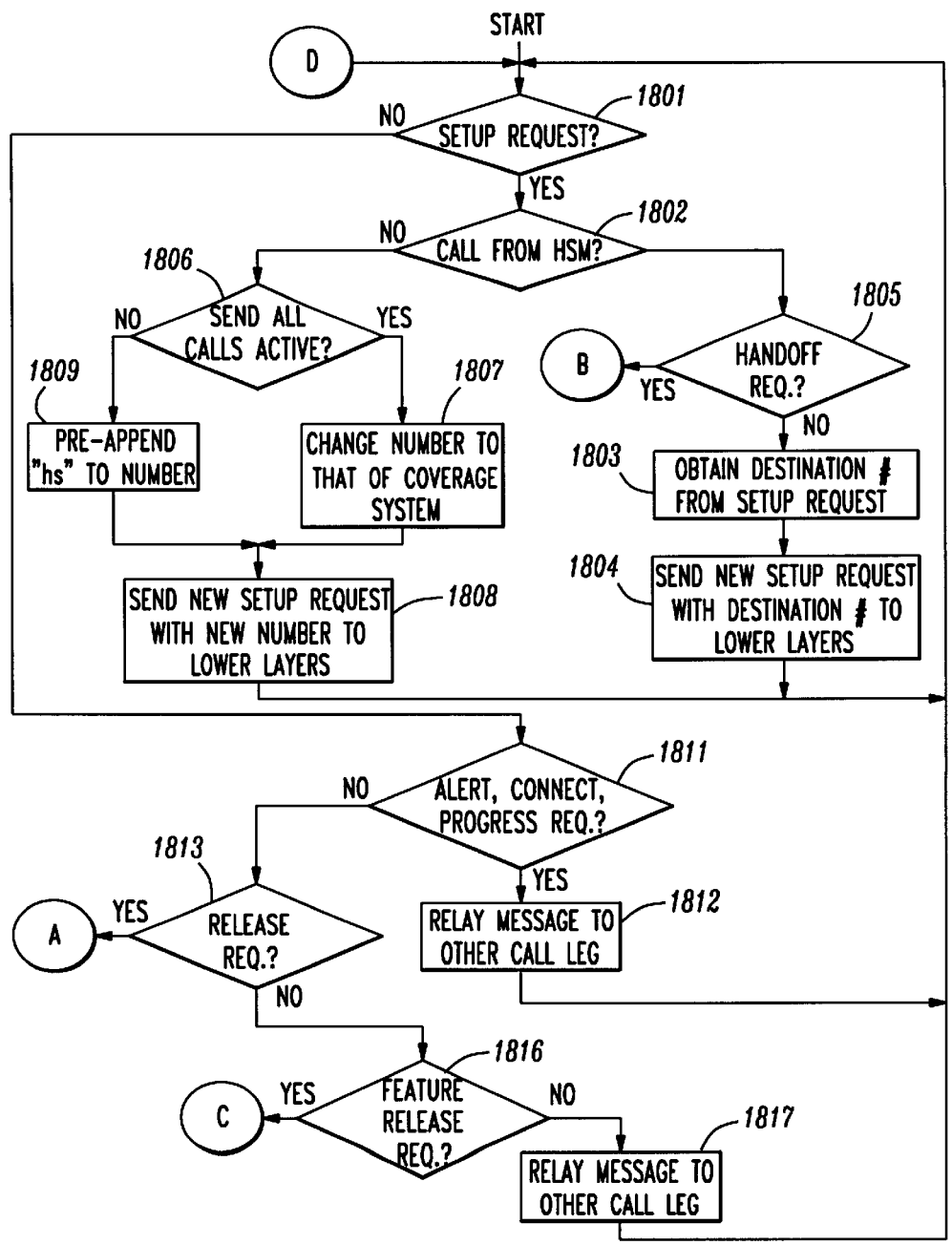
Figure 20:
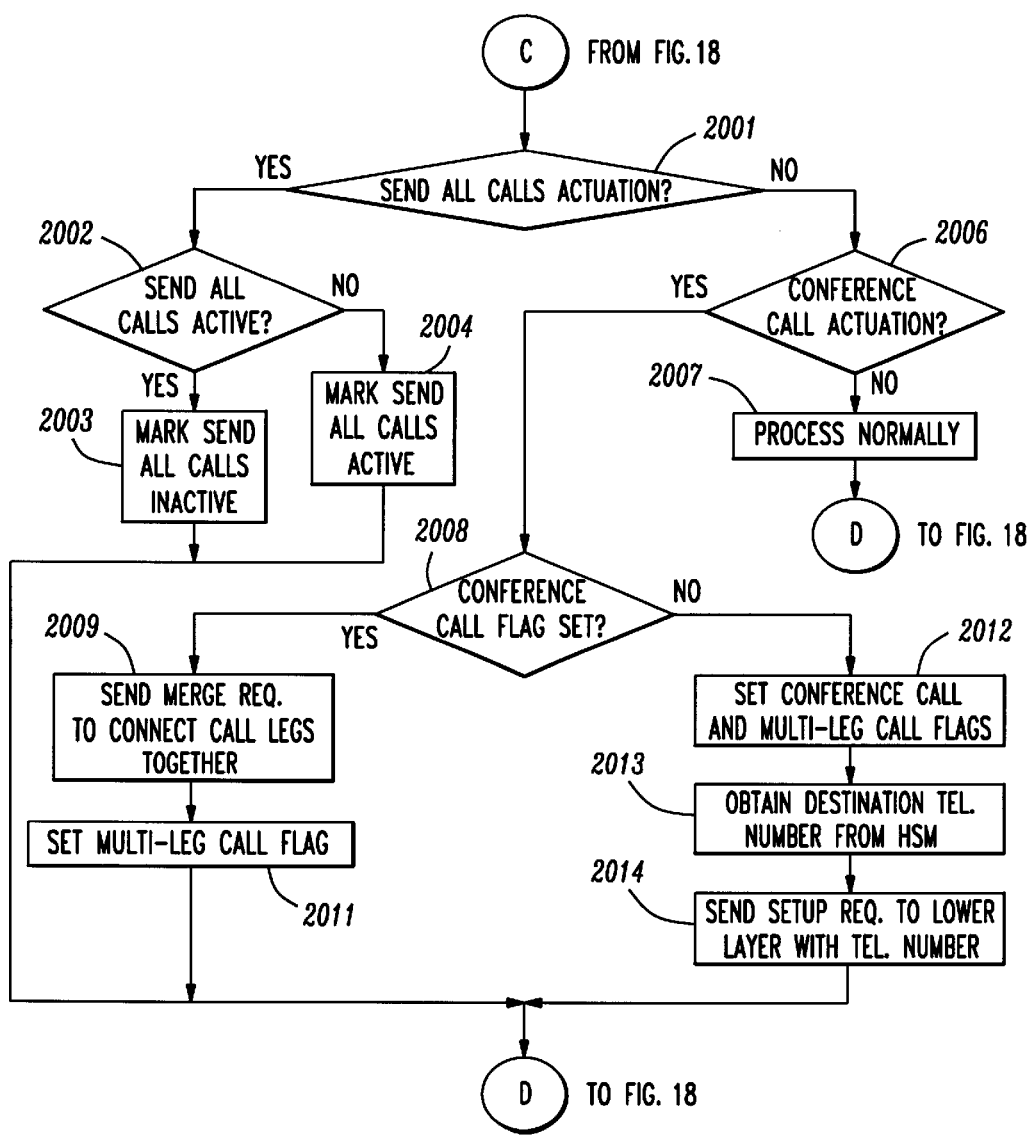
Figure 21:
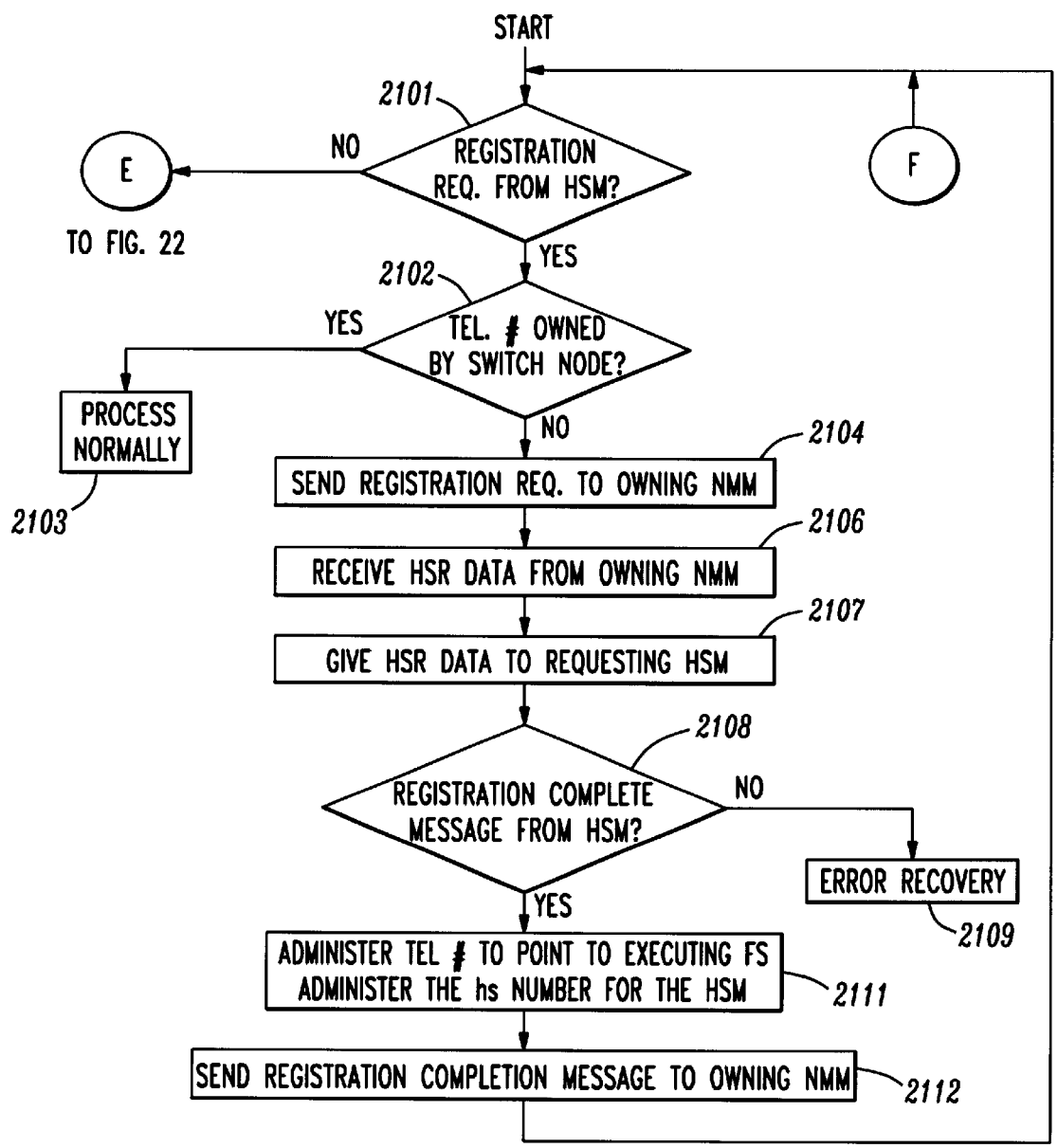

FIGS. 18–20 illustrate in flow chart form the steps performed by a FS application. Decision block 1801 is responsive to a message or request to determine if it is a setup request being received from the application level 7. If the answer is yes, decision block 1802 determines if it is a setup call from a HSM to establish a call or perform a handoff. If the answer is yes in decision block 1802, decision block 1805 determines if it is a handoff request. If the answer is no, control is transferred to block 1803. Block 1803 obtains the destination telephone number of the wireless handset to which the HSM application is attempting to establish a call. This destination telephone number is in a subparty field of the setup request. Once the destination telephone number is obtained, a new setup request is transmitted to the lower software layers for processing block 1804. The action of block 1804 results in a call being placed to the destination wireless handset or link.

Returning to decision block 1802, if the answer is no, this means that a call is being received from an entity other than the HSM application. The setup message is assumed to be from a wireless handset or another telecommunication terminal. If the answer in decision block 1802 is no, control is transferred to decision block 1806. Decision block 1806 determines if the send all calls feature is active since the call is from another wireless handset or other telecommunication terminal. If the answer is no in decision block 1806, the letters "hs" are appended to the receive destination telephone number which causes the call to be routed to the HSM application serving the wireless telephone. After execution of block 1809, control is transferred to block 1808 which uses the new number created in block 1809 or 1807 to generate a new setup request which is then sent to the lower software layers for processing. Returning to decision block 1806, if the answer is yes, block 1807 changes the destination number to the number of the call coverage system and transfers control to block 1808 whose operations have already been described.

Returning to decision block 1801, if the request is not a setup request, control is transferred to decision block 1811. Decision block 1811 determines if the request is an alerting, connect, or progress request. Any of these requests indicates that if bandwidth is required for the call, it should be added at this time. The FS application does not add the bandwidth. As was previously discussed, the messages relayed down the other leg of the call where lower levels, namely the interface manager, at level 3, requests that the connection manager application establish the proper bandwidth through the network of the switch node.

If the answer in decision block 1811 is no, decision block 1813 determines if the request is a release request. If the answer is no in decision block 1813, control is transferred to decision block 1816. Decision block 1816 determines if the request is a request from the HSM requesting a actuation of a particular feature. If the answer in decision block 1816 is no, block 1817 relays the message down the other leg of the call.

Returning to decision block 1813, if the answer is yes, control is transferred to decision block 1901 of FIG. 19. Decision block 1901 determines if the call associated with the release request has more than two call legs as illustrated in FIG. 12 leaving session record 1207. For example, a three-way conference call has three call legs. If the answer in decision block 1901 is no, block 1906 relays the release request to the lower software layers. The lower software layers release the entire call so that the call is no longer established through the switch node. Decision blocks 1907 and 1908 determine if the handset manager handling the wireless handset is located on another switch node and the handset is idle. If the answer in both decision blocks 1907 and 1908 is yes, block 1909 transmits an idle message to the NMM application. In response to this idle message, the NMM application will transfer the call control functions performed by the FS application to the FS application on the switch node that is executing the HSM application. Note, if the decision in decision blocks 1907 and 1908 is no, control is also returned to decision block 1801 of FIG. 18.

Returning to decision block 1901, if the answer is yes, block 1902 sends an un-merge request to the lower software layers to disconnect just this call leg of the multi-leg call. Decision block 1903 then determines if there are more than two call legs active. If the answer is no, block 1904 resets the multi-leg call flag. If the answer in decision block 1903 is yes, control is returned back to decision block 1801 of FIG. 18.

Returning to decision block 1805 of FHG. 18, if the answer is yes, it is a handoff request, and control is transferred to block 1911 of FIG. 19. Block 1911 sends an un-merge request to disconnect the leg of the call connected to the HSM application on the current switch node. Block 1912 then sends a merge request to the lower software layers to add the new call leg from the new HSM that just transmitted the handoff request. After execution of block 1912, control is transferred back to decision block 1801 of FIG. 18.

Returning to decision block 1816 of FIG. 18, if the request is a feature actuation request from the HSM application, control is transferred to decision block 2001 of FIG. 20. In the present implementation, only two features are illustrated as being possible. These two features are send all calls and a three way conference. One skilled in the art could readily determine how to provide other features. Decision block 2001 determines if the feature actuation is for the send all calls feature. If the answer is yes, decision block 2002 determines if send all calls is currently active. It is assumed on the wireless handset that there is only one button for the send all calls feature. This button is both used to activate and deactivate the send all calls feature. If the answer in decision block 2002 is no that send all calls is not currently active, block 2004 marks send all calls as active before returning control to decision block 1801 of FIG. 18. If the answer in decision block 2002 is yes, block 2003 marks the send all calls feature as inactive before returning control to decision block 1801 of FIG. 18.

If the answer in decision block 2001 is no, control is transferred to decision block 2006 which determines if a conference call is being actuated. If the answer in decision block 2006 is no, block 2007 will process any other feature actuation in a normal manner before returning control to decision block 1801. In response to a yes decision in decision block 2006, decision block 2008 determines if the conference call flag is set. If the conference call flag is set, this means that the wireless handset has completed the call to the third telecommunication terminal and now wants to create the three way conference. If the answer in decision block 2008 is yes, block 2009 sends the merge request to the lower software layers to cause the three call legs to be connected together with bandwidth. Block 2011 sets the multileg call flag before transferring control back to decision block 1801 of FIG. 18.

Returning to decision block 2008, if the conference call flag is not set, block 2012 sets the conference call and multi-leg call flags, and block 2013 requests the telephone number of the third telecommunication terminal that is to be added to the current call from the HSM application. After this destination telephone number is received, block 2014 sends a setup request to the lower software layers with the telephone number before transferring control back to decision block 1801 of FIG. 18.

FIGS. 21–29 illustrate the steps performed by an NMM application. Decision block 2101 determines if a registration request has been received from a HSM application. If the answer is yes, decision block 2102 determines if the telephone number is owned by the switch node executing the present NMM application. If the answer is yes, block 2103 does normal processing since it is not necessary to transfer any data from other switch nodes. If the answer in decision block 2102 is no, block 2104 sends a request to the NMM owning the telephone number requesting the HSR data. The HSR data is received by block 2106, and block 2107 stores the HSR data and informs the HSM application of this fact. Decision block 2108 waits for a registration complete message from the HSM application. If no such registration complete message is received, block 2109 does error recovery. If a registration complete message is received from the HSM, control is transferred to block 2111 which administers the "hs" number and the telephone number (which identifies the controlling FS) on the present switch node for the HSM application. Finally, block 2112 sends a registration completion message to the owning NMM application before returning control to decision block 2101.

Figure 22:
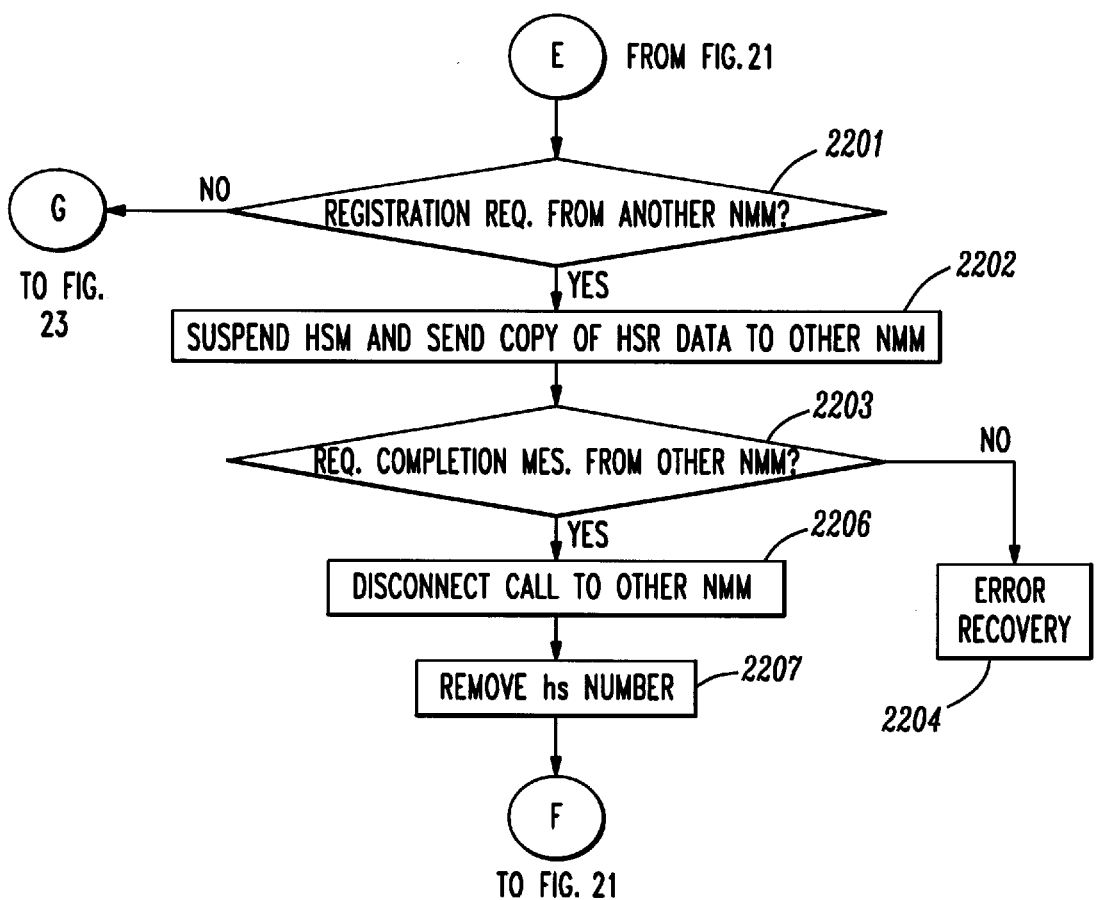

Returning to decision block 2101, if a registration request has not been received from an HSM application, control is transferred to decision block 2201 of FIG. 22. Decision block 2201 determines if a registration request has been received from another NMM application. This occurs if the present NMM application owns the telephone number for a handset which is trying to register on the switch node executing the other NMM application. Block 2104 of FIG. 21 generates such a request. If the answer in decision block 2201 is yes, block 2202 suspends the HSM application and sends a copy of the HSR data to the other NMM application. If the HSM is on a third switch node, a message will be sent to the NMM application of the third switch node requesting the HSR data. The third NMM application will suspend the HSM and transfer the HSR data back. Decision block 2203 then waits for the registration completion message from the other NMM application. If no such message is received, block 2204 does error recovery. If the registration completion message is received, control is transferred to block 2206 which disconnects the call to the other NMM application and transfers control to block 2207. The latter block removes the "hs" number. Finally, control is transferred to decision block 2101 of FIG. 21.

Figure 23:
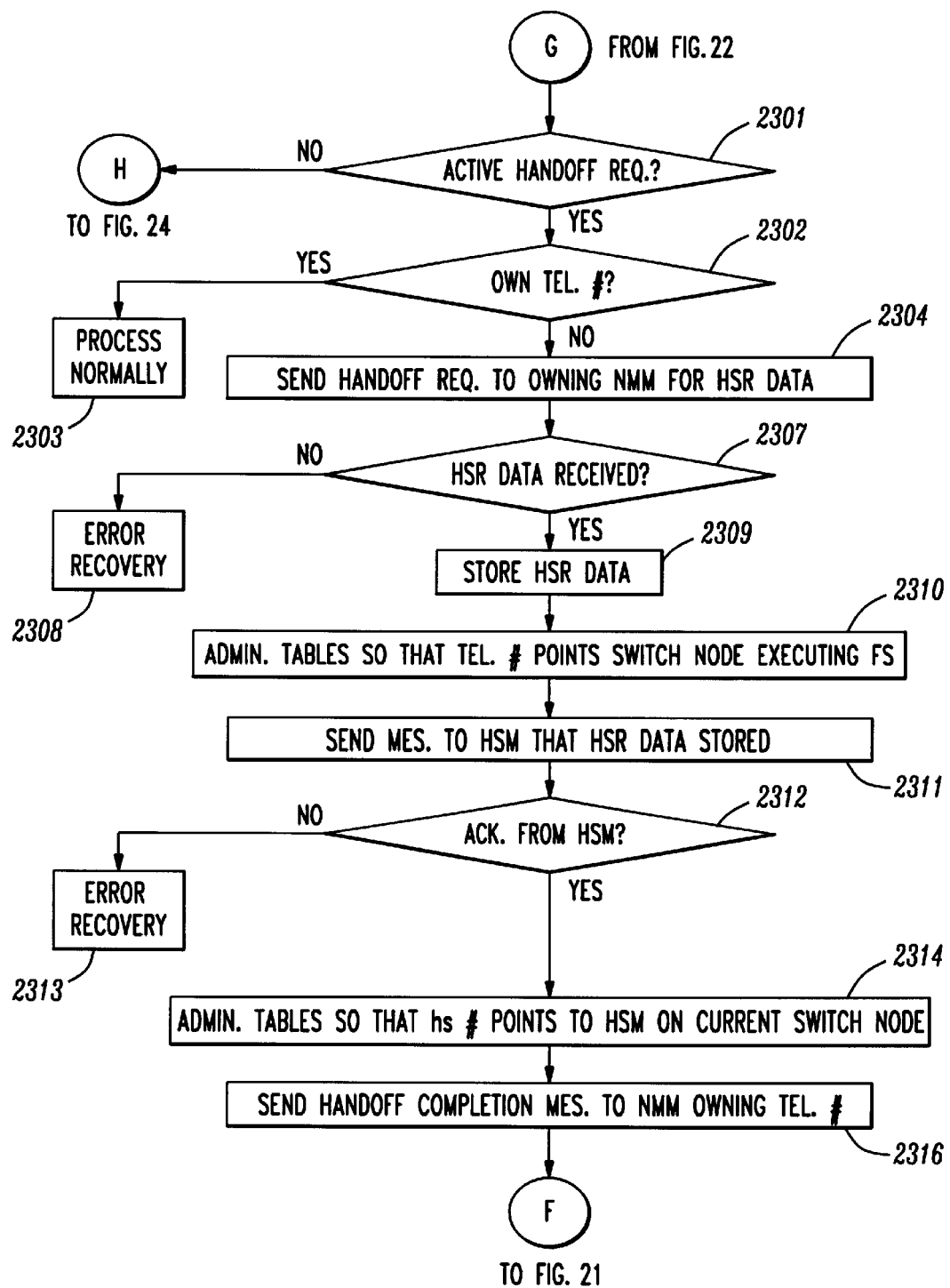
Figure 24:
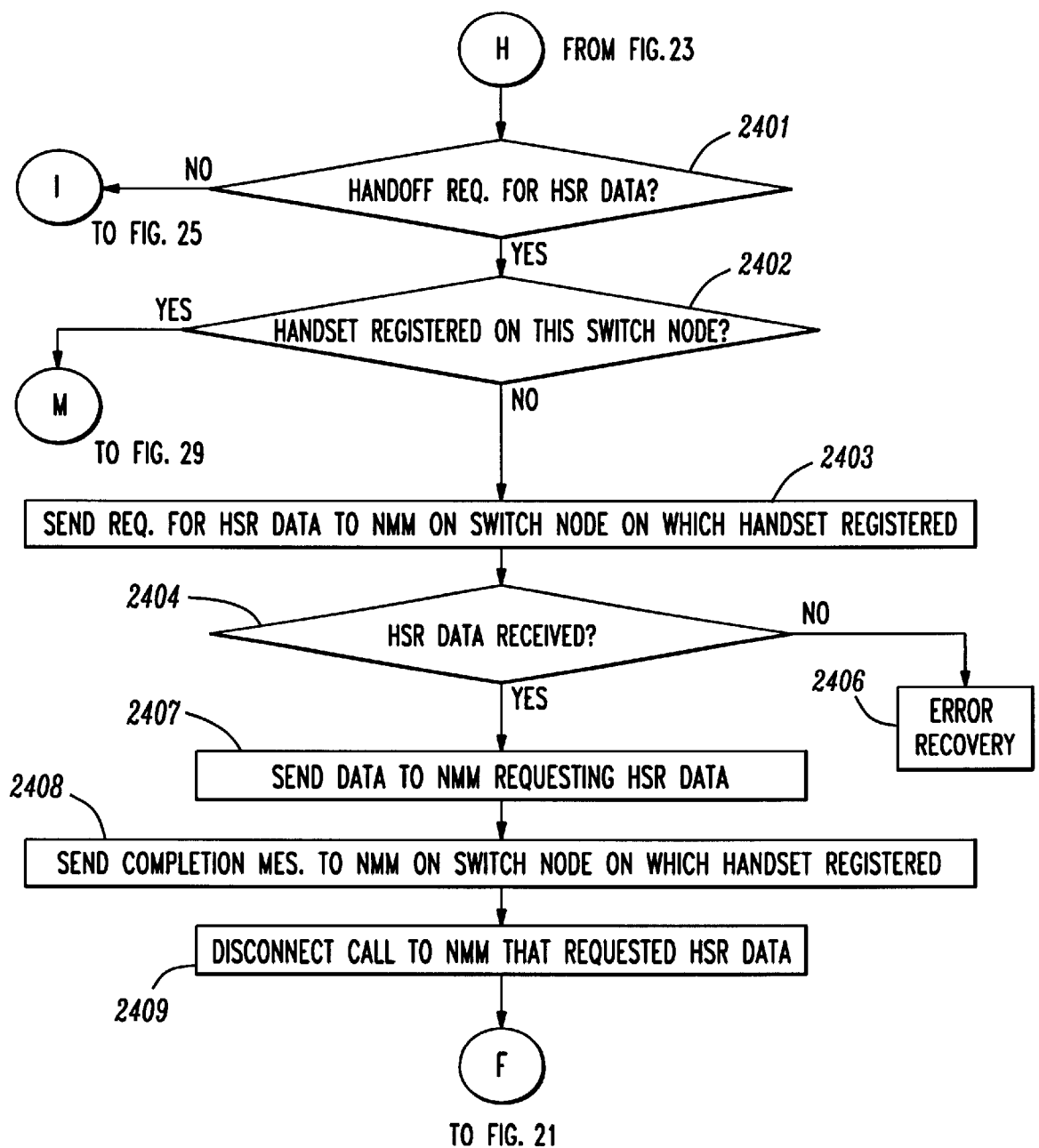

Returning to decision block 2201 of FIG. 22, if the answer is no, control is transferred to decision block 2301 of FIG. 23. Decision block 2301 determines if an active handoff request is being received. If the answer is yes, decision block 2302 determines if the telephone number of the wireless handset requesting the handoff is owned by the present NMM application. If the answer is no, block 2304 sends a handoff request to the owning NMM application requesting the HSR data. Decision block 2307 tests to see if the HSR data is received from the NMM application owning the telephone number. If the answer is no, error recovery is done by block 2308. If the answer in decision block 2307 is yes, block 2309 stores the HSR data. Then, block 2310 administers the table so that the telephone number points to the switch node executing the FS application. Block 2311 sends a message to the HSM application on the same switching node as the NMM application. Decision block 2312 determines if an acknowledgment is received from the HSM. If the answer is no, block 2313 does error recovery. If the answer in decision block 2312 is yes, block 2314 administers the tables so that the hs number points to the HSM application on the current switch node that is executing the NMM application performing blocks 2301–2316. Finally, a handoff completion message is sent to the NMM application owning the telephone number before control is transferred to decision block 2101 of FIG. 21.

Returning to decision block 2302, if the NMM application owns the telephone number, block 2303 does normal processing. This normal processing consists of executing operations similar to those of blocks 2310–2314. Returning to decision block 2301, if an active handoff request is not detected, control is transferred to decision block 2401 of FIG. 24. The latter decision block determines if a handoff request requesting HSR data is being received. Such a request would be generated by a NMM application executing block 2304 of FIG. 23. Hence, blocks 2401–2411 are executed by the NMM application owning the telephone number of the handset requesting the active handoff. If the answer in decision block 2401 is yes, decision block 2402 determines if the handset is registered on the switch node executing the NMM application. If the answer is yes, control is transferred to decision block 2901 of FIG. 29.

Returning to decision block 2402, if the handset is not registered on this switch node, block 2403 sends a request for the HSR data to the NMM application on the switch node on which the handset is registered. Decision block 2464 determines if the HSR data is received. If the answer is no, block 2406 does error 10 recovery. If the HSR data is received, block 2407 sends the HSR data to the requesting NMM application. Finally, a completion message is sent to the NMM application executing on the switch node on which the handset is registered, and block 2409 disconnects the call to the NMM application that requested the HSR data before returning control to decision block 2101 of FIG. 21.

Figure 25:
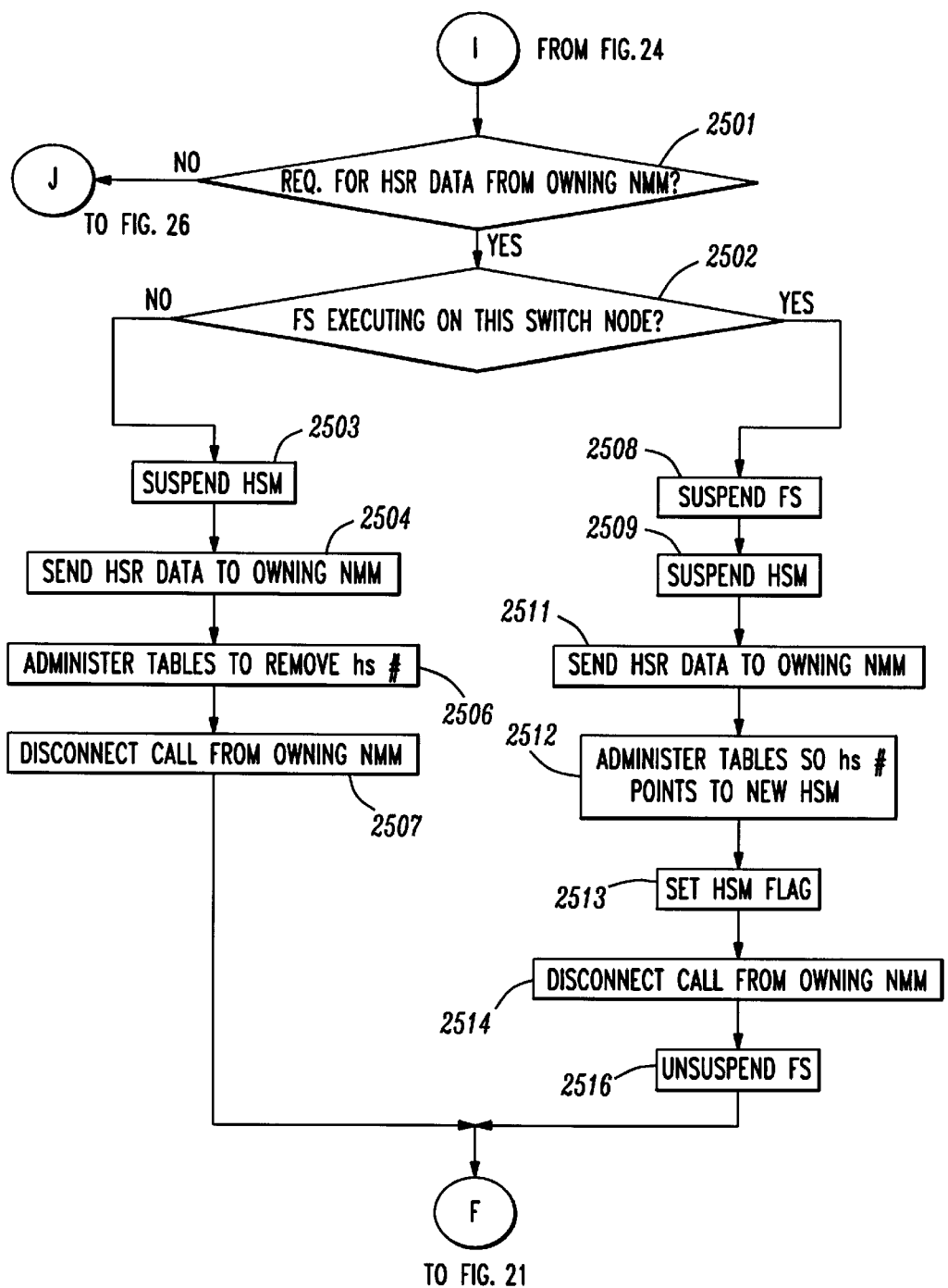

Returning to decision block 2402, if the handset is registered on this switch node, control is transferred to decision block 2902 of FIG. 25. Blocks 2902 through 2916 are performed by the owning NMM application that is executing on the switch node that is executing the HSM application that was controlling the handset requesting the handoff. Decision block 2902 determines if the FS application controlling the handset is executing on this switch node. If the answer is yes, block 2908 suspends the FS application, and block 2909 suspends the HSM application. Block 2911 sends the HSR data to the requesting NMM application. Block 2912 administers the table so that the HS number points to the new HS application controlling the handset after handoff. Block 2913 sets the HSM flag. Block 2916 unsuspends the FS application before returning control back to decision block 2101 of FIG. 21.

Returning to decision block 2401, if a handoff request for HSR data is not being received, control is transferred to decision block 2501 of FIG. 25. Blocks 2501 through 2516 are performed by the NMM application that is executing on the switch node that is executing the HSM application that was controlling the handset requesting the handoff. This is only true if this switch node is not executing the owning NMM application. If the answer is yes in decision block 2501, decision block 2502 determines if the FS application controlling the handset is executing on this switch node. If the answer is yes, block 2508 suspends the FS application and block 2509 suspends the HSM application. Block 2511 sends the HSR data to the owning NMM application. Block 2512 administers the table so that the HS number points to the new HS application controlling the handset after handoff. Block 2513 sets the HSM flag. Block 2514 disconnects the call from the owning NMM, and block 2516 unsuspends the FS application before returning control back to decision block 2101 of FIG. 21.

Returning to decision block 2502, if the FS application is not executing on this switch node, block 2503 suspends the HSM application, and block 2504 sends the HSR data to the owning NMM application. Finally, block 2506 administers the table to remove the hs number, and block 2507 disconnects the call from the owning NMM application before transferring control back to decision block 2101 of FIG. 21.

Figure 26:
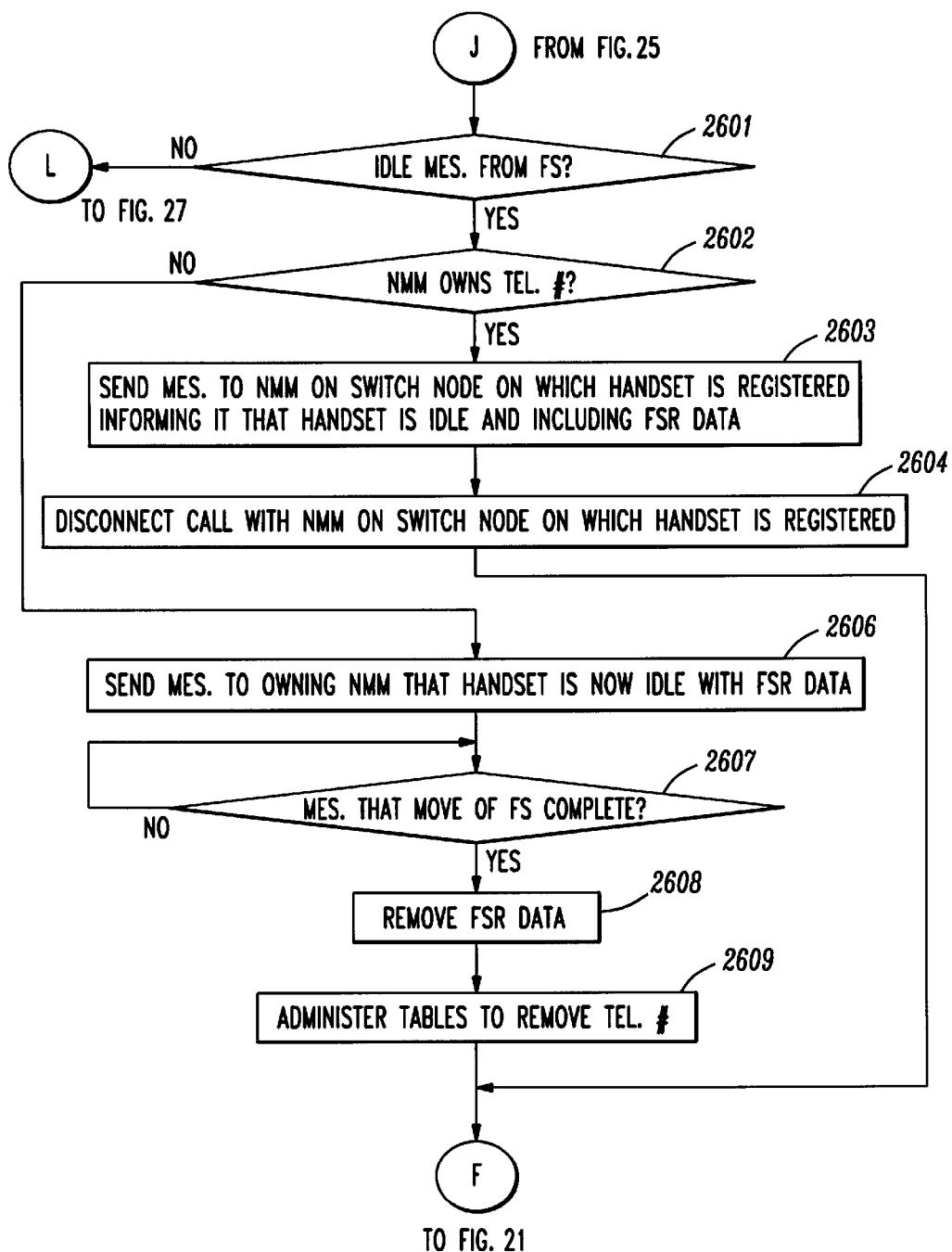
Figure 27:
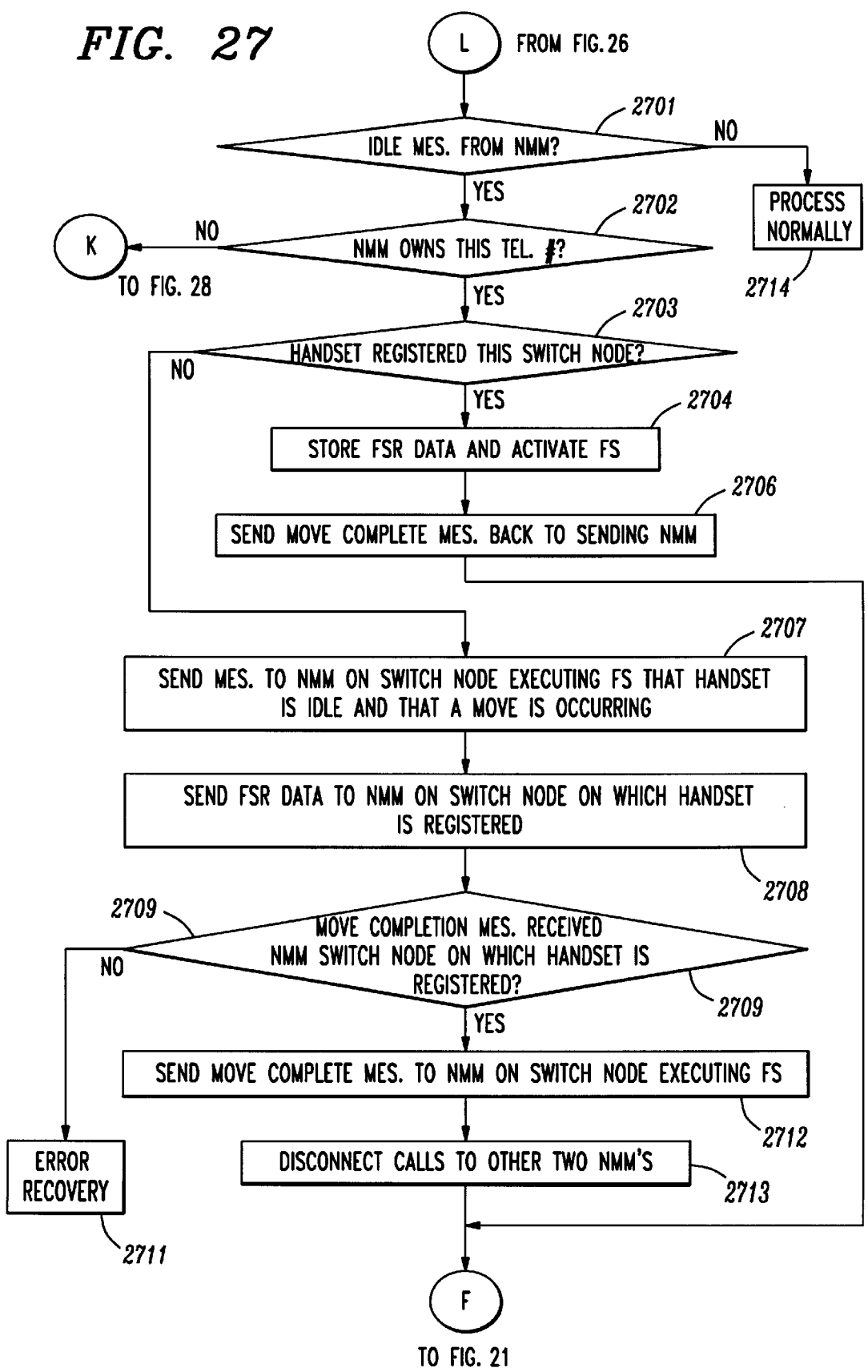

Returning to decision block 2501, if it is not a request for HSR data from the owning NMM application, control is transferred to decision block 2601 of FIG. 26. Blocks 2601–2609 are executed by a NMM application that has received a idle message from a FS application executing on the same switch node. The idle message is generated when the FS application determines that the wireless handset is not active on any call. The purposes of blocks 2601–2609 is to remove the FS application from this switch node with respect to the wireless handset and to inform the owning NMM application. If the answer in decision block 2601 is yes, decision block 2602 determines if the current NMM application owns the telephone number; hence, is the owning NMM application. If the answer is yes, block 2603 sends a message to the NMM application on the switch node on which the handset is now registered informing this NMM application that the handset is idle. The message also includes the FSR data. Next, block 2604 disconnects the call with the NMM application on the switch node on which the handset is registered before returning control to decision block 2101 of FIG. 21.

Returning to decision block 2602, if the NMM application does not own the telephone number, control is transferred to block 2606 that sends a message to the owning NMM application that the handset is idle. This message also includes the FSR data. Decision block 2607 waits until a move of the FS application complete message is returned by the owning NMM application. When the message is received, block 2608 removes the FSR data from the switch node, and block 2609 administers the table to remove the telephone number before returning control to decision block 2101 of FIG. 21.

Returning to decision block 2601, if the answer is no, control is transferred to decision block 2701. Decision block 2701 determines if there is an idle message from another NMM application. Such an idle message would be transmitted by block 2603 or block 2606 of FIG. 26. If the answer is yes in decision block 2701, block 2702 determines if the NMM application owns the telephone number of the handset that that has just become idle. If it is the owning NMM application, blocks 2703–2713 perform the operations of moving FSR data received in the idle message and activating a FS application on the switch node on which the handset is now registered. If the NMM application does not own this telephone number, then blocks 2101–2804 are performed by a NMM application on which the handset is active but does not own the telephone number. If the answer in decision block 2702 is yes, decision block 2703 determines if the handset is registered on this switch node. If the answer is yes, block 2704 stores the FS data and activates the FS application. Finally, block 2606 sends a move complete message back to the sending NMM application before transferring control back to decision block 2101 of FIG. 21.

Returning to decision block 2703, if the handset is not registered on this switch node, control is transferred to block 2707. The latter block sends a message to the NMM application on the switch node that is executing the FS application for the handset. The message defines that the handset is idle and that a move is occurring. After execution of block 2707, block 2708 sends the FSR data to the NMM application on the switch node on which the handset is registered. Decision block 2709 waits for a move completion message to be received from the NMM application on the node on which the handset is registered. If this message is not received, error recovery is performed by block 2711. If the completion message is received, block 2712 sends a move complete message to the NMM application on the switch node executing the FS application. Finally, block 2713 disconnects the calls with the other two NMM applications before returning control to decision block 2101 of FIG. 21.

Figure 28:
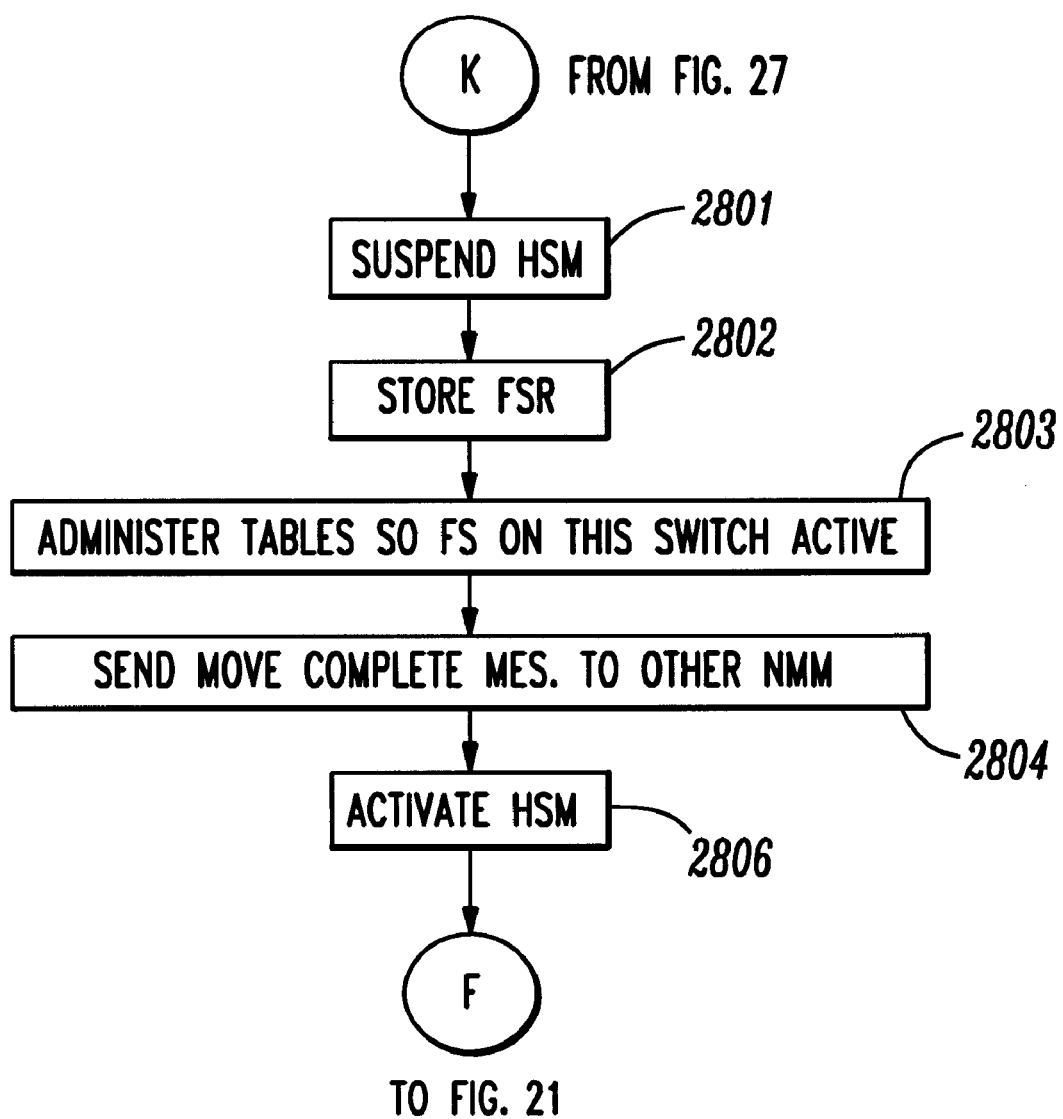

Returning to decision block 2702, if the NMM application does not own the telephone number of the handset that is now idle, control is transferred to block 2801 of FIG. 28. Block 2801 suspends the HSM application, and block 2802 stores the FSR data. Block 2803 administers the table so that the FS application on this switch node is active and serving the handset. After execution of block 2803, block 2804 sends a move complete message to the other NMM application. Finally, block 2806 activates the HSM application.

It is to be understood that the above-described embodiments are merely illustrative of the principles of the invention and that other arrangements may be devised by those skilled in the art without departing from the spirit and scope of the invention. In particular, other software and hardware structures may be used to implement the invention. Further, it would be apparent to one skilled in the art that the invention could be applied to switching systems other than telecommunication switching systems.

The invention claimed is:

1. A method of providing wireless service for a plurality of wireless handsets by a wireless switching system having a plurality of switch nodes with each of the plurality of switch nodes being connected to an individual set of a plurality-of base stations, comprising steps of:

executing a first application for controlling continuously call functions of wireless calls that originated on a first one of the plurality of switch nodes;

executing a first application for controlling handset functions on the first one of the plurality of switch nodes and the first application for controlling handset functions provides direct control of one of the plurality of wireless handsets connected via one of a first individual set of the plurality of base stations to the first one of the plurality of switch nodes and the one of the plurality of wireless handsets engaged in a wireless call that originated on the first one of the plurality of switch nodes;

transferring the control of one of the plurality of wireless handsets to a second application for controlling handset functions executing on a second one of the plurality of switch nodes upon a handoff of the one of the plurality of wireless handsets to one of a second individual set of the plurality of base stations connected to the second one of the plurality of switch nodes; and establishing telecommunication call between the second application for controlling handset functions and the first application for controlling call functions with the first application for controlling call functions continuing to control the wireless call.

2. The method of claim 1 further comprises the step of providing control of all call features for the wireless calls that originate on the first one of the plurality of switch nodes by the first application for controlling call functions.

3. The method of claim 2 further comprises the step of transferring call control for wireless calls engaged in by the one of the plurality of wireless handsets to a second application for controlling call functions executing on the second one of the plurality of switch nodes upon the one of the plurality of wireless handsets becoming inactive on all wireless calls while the second application for controlling handset functions is controlling the handset functions of the one of the plurality of wireless handsets.

4. The method of claim 3 wherein each of the plurality of wireless handsets has a handset service record having information defining attributes of each of the plurality of wireless handsets with each of the handset service records being maintained by the application for controlling handset functions executing on the one of the plurality of switch nodes on which each of the plurality of wireless handsets associated with each of the handset service records is connected and the step of transferring the control of the one of the plurality of wireless handsets comprises the step of transferring a handset service record of the one of the plurality of wireless handsets from the first one of the plurality of switch nodes to the second one of the plurality of switch nodes.

5. The method of claim 4 wherein each of the plurality of wireless handsets is assigned for administration functions to an individual one of the plurality of switch nodes and each of the plurality of switch nodes executing an application for controlling network management functions whereby each of the applications for controlling network management functions controls administration functions on the one of the plurality of switch nodes on which each of the applications for controlling network management functions is executing and the step of transferring of the handset service record of the one of the plurality of wireless handsets comprises the steps of requesting the handset service record from a second application for controlling network management functions executing on the second one of the plurality switch nodes by the second application for controlling handset functions transmitting a first message;

requesting in response to the first message the handset service record from a third application for controlling network management functions executing on a third one of the plurality of switch nodes to which the one of the plurality of wireless handsets is assigned by the second application for controlling network management functions transmitting a second message;

requesting in response to the second message the handset service record from a first application for controlling network management functions executing on the first one of the plurality of switch nodes by the third application for controlling network management functions transmitting a third message; and communicating in response to the third message the handset service record by the first application for controlling network management functions to the second application for controlling network management functions via the third application for controlling network management functions.

6. The method of claim 5 wherein each of the plurality of wireless handsets is assigned an individual routing number and an application for controlling handset functions for controlling handset functions of each of the plurality of wireless handsets is identified for call routing by forming a first routing number type that is the routing number of each of the plurality of wireless handsets catenated with a first predefined set of characters whereby the first routing number type is used by applications for controlling call functions to establish calls to applications for controlling handset functions.

7. The method of claim 6 wherein an application for controlling network management functions for each of the plurality of switch nodes is identified for call routing by forming a group of numbers of a second routing number type that is the routing number of each of the plurality of wireless handsets assigned to each of the plurality of switch nodes catenated with a second predefined set of characters.

8. The method of claim 4 wherein each of the plurality of wireless handsets has a feature service record having information defining call state and call feature state for each of the plurality of wireless handsets with each of the feature service record being maintained by the application for controlling call functions executing on the one of the plurality of switch nodes on which the wireless handset associated with each of the feature service records originated a present wireless call and the step of transferring call control comprises the step of transferring a feature service record of the one of the plurality of wireless handsets from the first one of the plurality of switch nodes to the second one of the plurality of switch nodes.

9. The method of claim 8 wherein each of the plurality of wireless handsets is assigned for administration functions to an individual one of the plurality of switch nodes and each of the plurality of switch nodes executing an application for controlling network management functions whereby each of the applications for controlling network management functions controls administration functions on the one of the plurality of switch nodes on which each of the applications for controlling network management functions is executing and the step of transferring the feature service record of the one of the plurality of wireless handsets comprises the steps of sending a first message to a first application for controlling network management functions executing on the first one of the plurality switch nodes by the first application for controlling call functions in response to termination of the first wireless call;

transmitting the feature service record by the first application for controlling network management functions to a third application for controlling network management functions executing on a third one of the plurality of switch nodes to which the one of the plurality of wireless handsets is assigned; and transmitting the feature service record by the third application for controlling network management functions to a second application for controlling network management functions executing on the second one of the plurality of switch nodes.

10. The method of claim 9 wherein each of the plurality of wireless handsets is assigned an individual routing number and an application for controlling handset functions for controlling handset functions of each of the plurality of wireless handsets is identified for call routing by forming a first routing number type that is the routing number of each of the plurality of wireless handsets catenated with a first predefined set of characters whereby the first routing number type is used by applications for controlling call functions to establish calls to applications for controlling handset functions.

11. The method of claim 10 wherein an application for controlling network management functions for each of the plurality of switch nodes is identified for call routing by forming a group of numbers of a second routing number type that is the routing number of each of the plurality of wireless handsets assigned to each of the plurality of switch nodes catenated with a second predefined set of characters.

12. A wireless switching system for providing wireless service for a plurality of wireless handsets and the wireless switching system having a plurality of switch nodes with each of the plurality of switch nodes being connected to an individual set of a plurality of base stations, comprising:

means for executing a first application for controlling continuously call functions of wireless calls that originated on a first one of the plurality of switch nodes;

means for executing a first application for controlling handset functions on the first one of the plurality of switch nodes and the first application for controlling handset functions provides direct control of one of the plurality of wireless handsets connected via one of a first individual set of the plurality of base stations to the first one of the plurality of switch nodes and the one of the plurality of wireless handsets engaged in a wireless call that originated on the first one of the plurality of switch nodes;

means for transferring the control of one of the plurality of wireless handsets to a second application for controlling handset functions executing on a second one of the plurality of switch nodes upon a handoff of the one of the plurality of wireless handsets to one of a second individual set of the plurality of base stations connected to the second one of the plurality of switch nodes; and means for establishing telecommunication call between the second application for controlling handset functions and the first application for controlling call functions with the first application for controlling call functions continuing to control the wireless call.

13. The wireless switching system of claim 12 further comprises means for providing control of all call features for the wireless calls that originate on the first one of the plurality of switch nodes by the first application for controlling call functions.

14. The wireless switching system of claim 13 further comprises means for transferring call control for wireless calls engaged in by the one of the plurality of wireless handsets to a second application for controlling call functions executing on the second one of the plurality of switch nodes upon the one of the plurality of wireless handsets becoming inactive on all wireless calls while the second application for controlling handset functions is controlling the handset functions of the one of the plurality of wireless handsets.

15. The wireless switching system of claim 14 wherein each of the plurality of wireless handsets has a handset service record having information defining attributes of each of the plurality of wireless handsets with each of the handset service records being maintained by the application for controlling handset functions executing on the one of the plurality of switch nodes on which each of the plurality of wireless handsets associated with each of the handset service records is connected and the means for transferring the control of the one of the plurality of wireless handsets comprises means for transferring a handset service record of the one of the plurality of wireless handsets from the first one of the plurality of switch nodes to the second one of the plurality of switch nodes.

16. The wireless switching system of claim 15 wherein each of the plurality of wireless handsets is assigned for administration functions to an individual one of the plurality of switch nodes and each of the plurality of switch nodes executing an application for controlling network management functions whereby each of the applications for controlling network management functions controls administration functions on the one of the plurality of switch nodes on which each of the applications for controlling network management functions is executing and the means for transferring of the handset service record of the one of the plurality of wireless handsets comprises means for requesting the handset service record from a second application for controlling network management functions executing on the second one of the plurality switch nodes by the second application for controlling handset functions transmitting a first message;

means for requesting in response to the first message the handset service record from a third application for controlling network management functions executing on a third one of the plurality of switch nodes to which the one of the plurality of wireless handsets is assigned by the second application for controlling network management functions transmitting a second message;

means for requesting in response to the second message the handset service record from a first application for controlling network management functions executing on the first one of the plurality of switch nodes by the third application for controlling network management functions transmitting a third message; and means for communicating in response to the third message the handset service record by the first application for controlling network management functions to the second application for controlling network management functions via the third application for controlling network management functions.

17. The wireless switching system of claim 16 wherein each of the plurality of wireless handsets is assigned an individual routing number and an application for controlling handset functions for controlling handset functions of each of the plurality of wireless handsets is identified for call routing by forming a first routing number type that is the routing number of each of the plurality of wireless handsets catenated with a first predefined set of characters whereby the first routing number type is used by applications for controlling call functions to establish calls to applications for controlling handset functions.

18. The wireless switching system of claim 17 wherein an application for controlling network management functions for each of the plurality of switch nodes is identified for call routing by forming a group of numbers of a second routing number type that is the routing number of each of the plurality of wireless handsets assigned to each of the plurality of switch nodes catenated with a second predefined set of characters.

19. The wireless switching system of claim 15 wherein each of the plurality of wireless handsets has a feature service record having information defining call state and call feature state for each of the plurality of wireless handsets with each of the feature service record being maintained by the application for controlling call functions executing on the one of the plurality of switch nodes on which the wireless handset associated with each of the feature service records originated a present wireless call and the means for transferring call control comprises means for transferring a feature service record of the one of the plurality of wireless handsets from the first one of the plurality of switch nodes to the second one of the plurality of switch nodes.

20. The wireless switching system of claim 19 wherein each of the plurality of wireless handsets is assigned for administration functions to an individual one of the plurality of switch nodes and each of the plurality of switch nodes executing an application for controlling network management functions whereby each of the applications for controlling network management functions controls administration functions on the one of the plurality of switch nodes on which each of the applications for controlling network management functions is executing and the means for transferring the feature service record of the one of the plurality of wireless handsets comprises means for sending a first message to a first application for controlling network management functions executing on the first one of the plurality of switch nodes by the first application for controlling call functions in response to termination of the first wireless call;

means for transmitting the feature service record by the first application for controlling network management functions to a third application for controlling network management functions executing on a third one of the plurality of switch nodes to which the one of the plurality of wireless handsets is assigned; and means for transmitting the feature service record by the third application for controlling network management functions to a second application for controlling network management functions executing on the second one of the plurality of switch nodes.

21. The wireless switching system of claim 20 wherein each of the plurality of wireless handsets is assigned an individual routing number and an application for controlling handset functions for controlling handset functions of each of the plurality of wireless handsets is identified for call routing by forming a first routing number type that is the routing number of each of the plurality of wireless handsets catenated with a first predefined set of characters whereby the first routing number type is used by applications for controlling call functions to establish calls to applications for controlling handset functions.

22. The wireless switching system of claim 21 wherein an application for controlling network management functions for each of the plurality of switch nodes is identified for call routing by forming a group of numbers of a second routing number type that is the routing number of each of the plurality of wireless handsets assigned to each of the plurality of switch nodes catenated with a second predefined set of characters.

* * * * *